United States Patent
Adams et al.

(10) Patent No.: US 9,304,915 B2
(45) Date of Patent: Apr. 5, 2016

(54) VIRTUALIZATION SYSTEM USING HARDWARE ASSISTANCE FOR PAGE TABLE COHERENCE

(71) Applicant: VMware, Inc., Palo Alto, CA (US)

(72) Inventors: Keith Adams, San Carlos, CA (US); Sahil Rihan, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 1 day.

(21) Appl. No.: 14/487,939

(22) Filed: Sep. 16, 2014

(65) Prior Publication Data

US 2015/0032935 A1    Jan. 29, 2015

Related U.S. Application Data

(63) Continuation of application No. 13/893,538, filed on May 14, 2013, now Pat. No. 8,838,914, which is a continuation of application No. 12/413,379, filed on Mar. 27, 2009, now Pat. No. 8,443,156.

(51) Int. Cl.
  *G06F 12/08* (2006.01)
  *G06F 12/10* (2006.01)
  *G06F 9/455* (2006.01)

(52) U.S. Cl.
  CPC ........ *G06F 12/0802* (2013.01); *G06F 9/45533* (2013.01); *G06F 9/45558* (2013.01); *G06F 12/0891* (2013.01); *G06F 12/1027* (2013.01); *G06F 12/1063* (2013.01); *G06F 12/1081* (2013.01); *G06F 2009/45583* (2013.01); *G06F 2212/152* (2013.01); *G06F 2212/50* (2013.01)

(58) Field of Classification Search
  CPC ............ G06F 12/0891; G06F 12/1027; G06F 12/1063; G06F 12/1081; G06F 2009/45583; G06F 9/45558
  See application file for complete search history.

(56) References Cited

U.S. PATENT DOCUMENTS

| | | | | |
|---|---|---|---|---|
| 7,222,221 B1 * | 5/2007 | Agesen | ............... | G06F 9/45537 707/999.2 |
| 7,610,431 B1 * | 10/2009 | Watkins | .............. | G06F 13/4022 710/100 |
| 7,650,482 B2 * | 1/2010 | Traut | .................... | G06F 12/109 711/207 |
| 8,086,822 B2 * | 12/2011 | Devine | ................ | G06F 12/1009 711/202 |

* cited by examiner

*Primary Examiner* — Yong Choe

(57) ABSTRACT

One embodiment of the present invention includes a method for maintaining a shadow page table in at least partial correspondence with guest page mappings of a guest computation. The method marking with a traced write indication at least those entries of the shadow page table that map physical memory locations which themselves encode the guest page mappings, the marking identifying, for a hardware facility, a subset of memory access targets for which updates are to be recorded in a guest write buffer accessible to the virtualization system. Responsive to a coherency-inducing operation of the guest computation, the method reads from the guest write buffer and introduces corresponding updates into the shadow page table.

18 Claims, 11 Drawing Sheets

VIRTUALIZATION SYSTEM USING HARDWARE ASSISTANCE FOR PAGE TABLE COHERENCE

CROSS-REFERENCE TO RELATED APPLICATION(S)

This application is a Continuation of U.S. patent application Ser. No. 13/893,538, filed May 14, 2013, which has issued as U.S. Pat. No. 8,838,914; which is a Continuation of U.S. patent application Ser. No. 12/413,379, filed Mar. 27, 2009, which has issued as U.S. Pat. No. 8,433,156; and which is related to commonly-owned, previously co-pending U.S. patent application Ser. No. 12/413,426, now U.S. Pat. No. 8,060,722, filed Mar. 27, 2009, entitled "HARDWARE ASSISTANCE FOR SHADOW PAGE TABLE COHERENCE WITH GUEST PAGE MAPPINGS" and naming as inventors, Adams and Rihan.

BACKGROUND

One challenge in the virtualization of modern computer architectures is creation and maintenance of memory mapping information in a form often referred to as shadow page tables. In general, shadow page tables encode virtual-to-physical memory mappings usable by a memory management unit or other facility of underlying hardware in mapping memory access targets of instructions executed on behalf of a guest computation. Typically, the guest computation is aware of mappings to an apparent physical address space of a virtual machine, but is unaware of actual mappings to an address space in underlying physical memory.

Thus, while mappings encoded in shadow page tables can correspond to mappings maintained by a guest operating system in conventional page tables (e.g., guest page tables), they typically go at least one step further, completing the mapping to addresses in underlying physical memory. To understand why this further mapping is relevant, it is important to recognize that the guest operating system (or an execution context thereof) is typically not aware that it executes on a virtual machine. Accordingly, the guest operating system and its execution contexts maintain and view the guest page tables as representing operant virtual-to-physical memory mappings, even though the mapped-to "physical" addresses are really addresses in a space that is itself virtualized by the virtualization system. Such guest page table mappings can therefore be understood as mappings from Guest Virtual Page Numbers (GVPNs) to Guest Physical Page Numbers (GPPNs).

Since the guest operating system executes in a virtual machine, another layer of mapping (e.g., from a Guest Physical Page Number, GPPN, to a machine Physical Page Number, PPN) is typically provided by the virtualization system. Shadow page tables (and cached representations of entries thereof) provide an efficient mechanism for encoding mappings from GVPNs to PPNs and therefore allow the virtualization system to manage direct execution of guest code on underlying hardware, while avoiding (in most cases) a two-layer runtime mapping of memory addresses.

In some virtualization system implementations, coherence between shadow page tables and the guest page tables is assured by using page protection mechanisms to intercept guest writes to memory pages that contain guest page table information. A handler is used to service a resulting fault, updating a shadow page table entry (and the targeted guest page table entry) in correspondence with an intercepted guest write. Thereafter, control is returned to the execution context that generated the fault. Unfortunately, a coherence scheme that relies on page protection mechanisms in this way tends to introduce page fault overheads which are not present when executing on native hardware.

Improved and/or alternative methods are desired.

SUMMARY

Embodiments of the present invention include methods, systems, apparati, computer program products and other tangible realizations of techniques that use hardware assistance to provide page table coherence with memory mappings of a guest computation. One embodiment of the present invention is a method of managing memory mappings in a virtualization system, the method comprising: (a) maintaining a shadow page table in at least partial correspondence with guest page mappings of a guest computation; (b) marking with a traced write indication at least those entries of the shadow page table that map physical memory locations which themselves encode the guest page mappings, the marking identifying, for a hardware facility, a subset of memory access targets for which updates are to be recorded in a guest write buffer accessible to the virtualization system; and (c) responsive to a coherency-inducing operation of the guest computation, reading from the guest write buffer and introducing corresponding updates into the shadow page table.

BRIEF DESCRIPTION OF THE DRAWINGS

FIG. 4 also provides an illustration of relations between guest page mappings and the shadow page tables that may be maintained by a virtualization system and/or underlying hardware in accordance with one or more embodiments of the present invention.

FIG. 8 illustrates recordation of information in a memory-resident buffer for later consumption by a virtualization system in accord with some embodiments of the present invention.

FIG. 9 illustrates propagation of page mapping information to a shadow page table in connection with a coherence event or buffer full indication in accordance with some embodiments of the present invention.

The use of the same reference symbols in different drawings indicates similar or identical items.

DESCRIPTION

Figure 1:
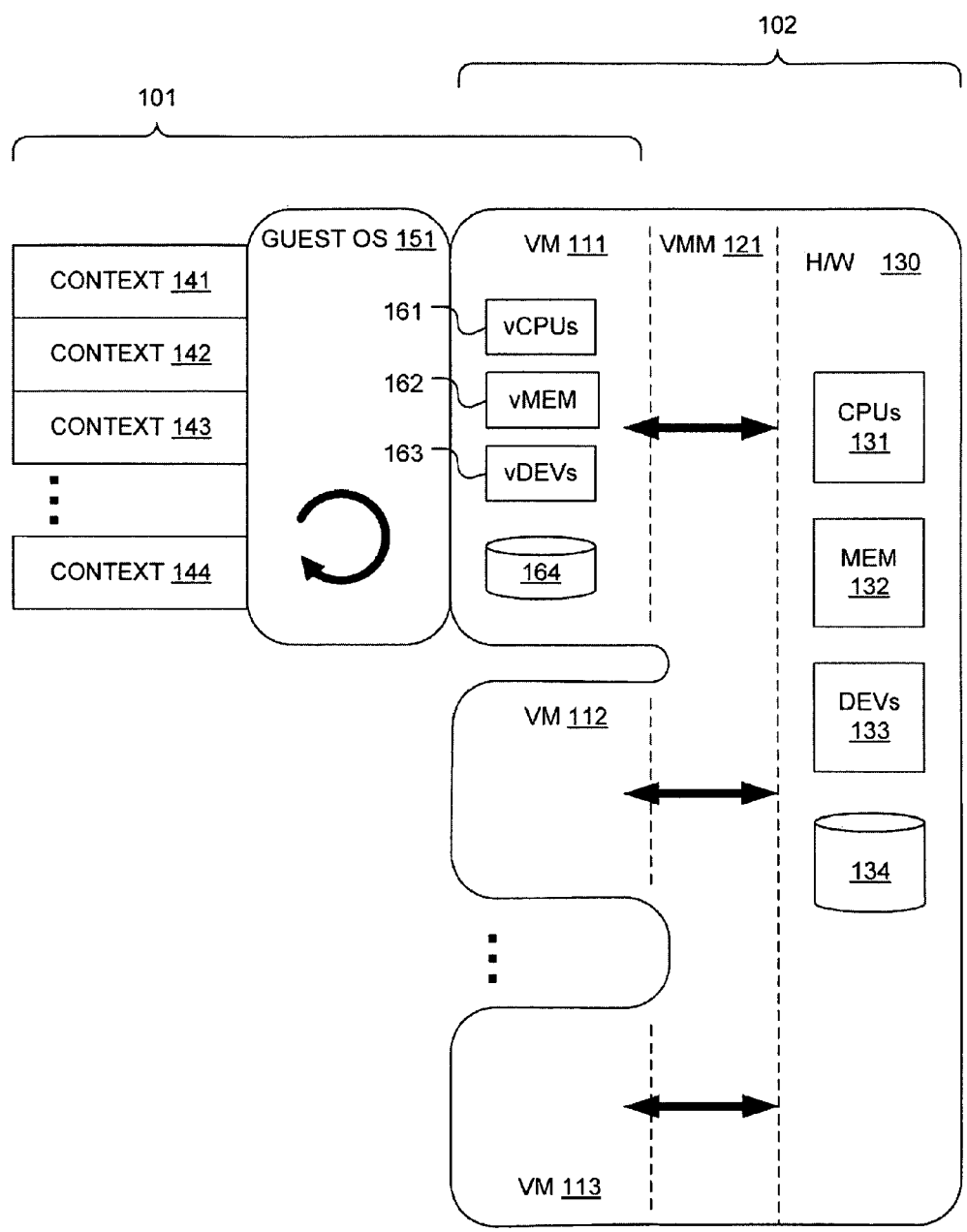
FIG. 1 depicts a virtualization system and an underlying physical machine in which one or more embodiments of the present invention may be used.

Various computational systems, including virtualization systems and operating systems that provide virtualization or isolation support, can benefit from designs and techniques that allow software to delegate detection of certain mapping-state-affecting memory access events to a hardware facility. For example, it has been discovered that virtualization systems that maintain a correspondence relation between shadow page tables and the page mappings of a guest computation can, in at least some situations, profitably delegate to an underlying memory management unit or facility the tracking of memory accesses that target locations that may themselves encode guest page tables. Virtualization software may then consume recorded memory access information at a time of its choosing, typically at a coherence boundary, and avoid overheads that might otherwise degrade performance and/or increase latency for certain memory accesses.

Many modern processor architectures tolerate imperfectly coherent elements of a virtual-to-physical page mapping hierarchy (e.g., translation lookaside buffer (TLB) states that are imperfectly coherent with states of underlying page table entries). For example, a TLB entry may become stale and therefore incoherent with respect to an updated state of a page table entry to which it corresponds. An operating system implementation is then expected to interact with the virtual-to-physical page mapping hierarchy in a way that tolerates at least transient incoherence. In some architectures, coherence is guaranteed only after an explicit software-initiated TLB flush or other coherency-inducing operation (such as the invalidation of one or more targeted TLB entries) is performed.

Although the virtualization of a processor architecture may not require the emulation of a TLB (and virtualization products of VMware, Inc. do not export a virtual TLB that is visible to the guest), such an emulation, presenting a virtual TLB (vTLB) within the virtual machine, will be assumed in the following description. Building on the above-described architectural (and operating system) tolerance, virtualizations of such processor architectures could allow a virtual TLB (vTLB) entry to become stale, and therefore incoherent with the guest page table entry to which it corresponds. However, in some embodiments of the present invention, tolerance may be extended to further allow a shadow page table entry (and in some cases a corresponding TLB entry) to become incoherent (e.g., stale) with respect to the guest page table entry to which it corresponds. Although a guest operating system would be expected to resolve the transient inconsistency between a virtual TLB (vTLB) entry and the guest page table entry to which it corresponds, the guest operating system is not (typically) expected to even recognize that virtualization is occurring. Therefore, a conventional operating system would not (in general) be expected to itself reestablish coherence between mappings maintained by the virtualization system (e.g., shadow page tables and/or any cache thereof in a TLB of underlying hardware) and guest page mappings.

Instead, in one or more embodiments in accordance with the present invention, methods, systems, apparati, computer program products and/or other tangible realizations of techniques are employed to allow a virtualization system (including, in some cases, an operating system that provides virtualization support) and underlying hardware (e.g., a memory management unit) to coordinate to efficiently accumulate and process information by which the virtualization may re-establish coherence. In general, these techniques tend to avoid taxing individual memory accesses performed on behalf of a guest computation with overheads (and latencies) associated with exception and/or fault handling. Rather, some embodiments in accordance with the present invention augment guest virtual page (GVPN) to machine physical page (PPN) mappings to identify (for cooperating facilities of an underlying machine) those mappings that correspond to physical memory locations that themselves encode guest page table mappings. In some embodiments in accordance with the present invention, cooperating facilities of an underlying physical machine record, and make accessible to a virtualization system, information sufficient to allow the virtualization to later update its mappings (e.g., shadow page tables) in correspondence with already completed write-type accesses to the guest page table mappings. In this way, the virtualization software may consume the recorded memory access information at a time of its choosing, typically at a coherence boundary, and avoid overheads that might otherwise degrade performance and/or increase latency for individual memory accesses performed on behalf of the guest computation.

For the most part, embodiments of the present invention operate at (or from) a virtualization layer (e.g., within a virtual machine monitor or hypervisor) and do not require cooperation or support from a guest operating system running within a virtual machine. This independence can be useful when, as is often the case, the virtualization system helps to isolate multiple operating system instances and related computations from each other. That said, modern operating systems vendors face increasing pressure to include virtualization features or capabilities in their product offerings, and as a result, product offerings styled as operating systems may increasingly incorporate virtualization system concepts. Accordingly, it is important to recognize that a virtualization barrier or boundary, i.e., a barrier or boundary between (i) software that manages, exports and/or aggregates underlying hardware resources for presentation as a virtual machine and (ii) software that operates within such a virtual machine, can exist at the interface between separately supplied software components or within software marketed, aggregated and/or supplied as a single product. Indeed, embodiments that provide virtualization support in a software product marketed, aggregated and/or supplied as an "operating system" are envisioned and may fall within the scope of certain of the appended claims. This application uses the term "export" in connection with presenting virtualized hardware for use by guest software running in a virtual machine. The use of this term is not intended to limit the methods by which underlying hardware is presented to guest software as virtualized hardware. For example, "exporting" the underlying hardware resources of a physical computer system to a virtual machine may involve presenting virtual resources that are substantially different from the underlying hardware resources. As just one example of many, a LUN (Logical Unit Number) of a physical SAN (Storage Area Network) that is accessed through a HBA (Host Bus Adapter) may be "exported" to a virtual machine as a local SCSI (Small Computer System Interface) hard drive or as a USB (Universal Serial Bus) flash drive, so that the LUN appears to guest software to be a local SCSI drive or a USB flash drive.

For concreteness, embodiments based on facilities, terminology and memory models typical of certain illustrative processor architectures, operating systems, virtualization systems and memory designs are described. In particular, conventional paged virtual memory features, mechanisms and constructs typical of x86 (and IA-32) instruction set processor architectures from Intel Corporation and Microsoft® Windows operating systems provide a useful descriptive context for the described embodiments. That said, embodiments of the present invention are general to a wide variety of processor and memory architectures (including those of dissimilar design and including virtual memory mechanisms that implement differing addressing or mapping techniques), to numerous operating system implementations as well as to computations that need not include, or be coordinated by, a conventional operating system.

Accordingly, in view of the foregoing and without limitation on the range of underlying processor, memory or system designs; operating systems; or virtualization techniques that may be employed in embodiments of the present invention, based on these embodiments, and on the claims that follow, persons of ordinary skill in the art will appreciate a broad range of suitable implementations and embodiments.

Virtualization Systems, Generally

FIG. 1 depicts a virtualization system in which techniques in accordance with one or more embodiments of the present invention may be employed. In particular, FIG. 1 is meant to illustrate a class of virtualization system embodiments in which underlying hardware resources 130 are exported to guest computations as one or more isolated, and apparently independent, virtual machines (e.g., VM 111, VM 112 ... VM 113). In the illustrated system, guest system 151 (e.g., an instance of a conventional Microsoft® Windows or Linux® operating system) executes in coordination with VM 111, providing application software and operating system services with virtual computer 101 on (or in) which to execute. As is typical of modern operating system design, applications (and some services) usually run in their own memory address spaces and can include one or more execution contexts (e.g., contexts 141, 142, 143 . . . 144) each having an associated instruction pointer and other state. Typically, an execution context, which may be referred to as a "process," "thread" or "task" depending on conventions of the particular operating system or execution environment, includes at least state of processor registers (and perhaps uncommitted memory state) together with a virtual address space (consistent with page table mappings).

As on a conventional hardware computer platform, guest operating system 151 coordinates execution of sequences of instructions on one or more processors (or CPUs), helps to maintain memory management and/or mapping information (e.g., virtual-to-physical page mappings) and manages devices of an underlying computational machine. Together, the operating system and underlying computational machine (e.g., guest operating system 151 and VM 111 of virtual computer 101 in the illustrated configuration) manage context switches amongst various execution contexts based on priority, data or instruction memory access stalls, input/output events, explicit code directives, etc. Numerous techniques and designs (both hardware and software) for scheduling and performing context switches in multitasking/multithreaded systems are known and will be understood by persons of ordinary skill in the art. However, in each case, the identity of at least a current execution context is part of the observable state of the computational machine (or in the illustration of FIG. 1, of VM 111).

From the perspective of operating system 151 and the individual execution contexts thereof, VM 111 appears to be and, indeed, behaves like a conventional hardware computer platform, executing instruction sequences and presenting an apparent processor and memory state. Indeed, in some embodiments of virtualization system 102, the interface presented by VM 111 (including the apparent operation of virtual-to-physical memory mappings) may be nearly indistinguishable from a conventional hardware computer platform. However, unlike a conventional hardware computer platform, virtualization system 102 itself manages underlying hardware resources (e.g., without limitation, CPUs 131, memory 132, devices 133 and storage 134) and exports virtual resources (e.g., virtual processor(s) 161, vMEM 162, virtual devices 163 and virtual storage 164) rather than the underlying resources themselves to guest computations such as guest operating system 151 and any applications/services executing therewith. In particular, and relative to the description that follows, the interface presented by VM 111 typically presents a virtual-to-apparent-physical page mapping state in the form of memory-resident page directory and page table data structures, virtual TLB states, etc., but hides further mappings to actual physical pages in memory 132 used by virtualization system 102 to support a guest computation.

In general, the characteristics and configurations of a virtual machine need not match those of underlying hardware resources, although in many implementations, a correspondence between instruction set architectures of virtual processors and underlying hardware CPUs may be desirable. Although particular virtualization strategies/designs are described herein, virtualization system 102 is representative of a wide variety of designs and implementations in which underlying hardware resources are presented to software (typically to operating system software and/or applications) as virtualized instances of computational systems that may or may not precisely correspond to the underlying physical hardware.

Virtualization systems are well known in the art and include commercial implementations, such as VMware ESX™, VMware® ESX Server, VMware® Server and VMware® Workstation, available from VMware, Inc., Palo Alto, Calif.; Microsoft® Virtual Server 2005; operating systems with virtualization support, such as Linux KVM or user-mode Linux (UML); and open-source implementations such as those available from XenSource, Inc. Accordingly, persons of ordinary skill in the art will appreciate the described embodiments of this invention in the context of a substantial existing body of virtual machine technology.

Typically, virtual resources of a virtual machine are presented to a guest computation using mapping and/or emulation techniques. In general, some interface is provided between the guest software and the various hardware components and devices in the underlying hardware platform. This interface may include one or more software components and/or layers, possibly including one or more software components known in the field of virtual machine technology as "virtual machine monitors" (VMMs), "hypervisors," or virtualization "kernels." For purposes of illustration only, and without limitation, VMM layer 121 is illustrated in which the operative mappings and/or emulations will typically be performed. In the description that follows, certain enhancements or alterations are described that may be made to the operation of VMM and/or underlying hardware to facilitate coherence between an apparent virtual-to-physical page mapping state visible to guest operating system 151 and so-called shadow page mappings actually employed by VMM layer 121 and hardware 130 in furtherance of a guest computation. These and other embodiments will be understood with reference to the description that follows.

Paged Virtual Memory Support, Generally

Most modern memory hierarchies and processor designs employ or support virtual memory techniques. In general, virtual memory implementations provide a mechanism that allows a computational system to map from an apparent (or virtual) address space to a physical address space. Building on virtual-to-physical mappings, modern computational systems can present software with an apparent memory space that is larger (or smaller) than underlying physical memory; they can present software with an apparently contiguous working memory using an available, and typically non-contiguous, collection of memory blocks; and they can offer protection mechanisms by which certain portions of memory can be isolated from certain computations or processes or based on execution modes.

Paged virtual memory is by far the most common form of virtual memory supported by modern processor and memory architectures and by the operating systems that execute thereon. In typical paged virtual memory implementations, the address space of a process (or set of processes) is organized as a collection of blocks, or pages, of contiguous virtual memory addresses. The virtual memory addresses (e.g., references to data, branch targets, etc.) employed or manipulated by the program are translated or mapped to corresponding physical addresses used by hardware to reference specific locations in physical memory. Typically, virtual memory implementations encode mappings from virtual address space to physical address space using page tables and entries therein which code, for respective virtual pages, the location of a corresponding physical page in physical memory (if currently mapped). Page tables are typically maintained by an operating system in correspondence with its decisions regarding efficient use of the memory at its disposal.

Figure 2:
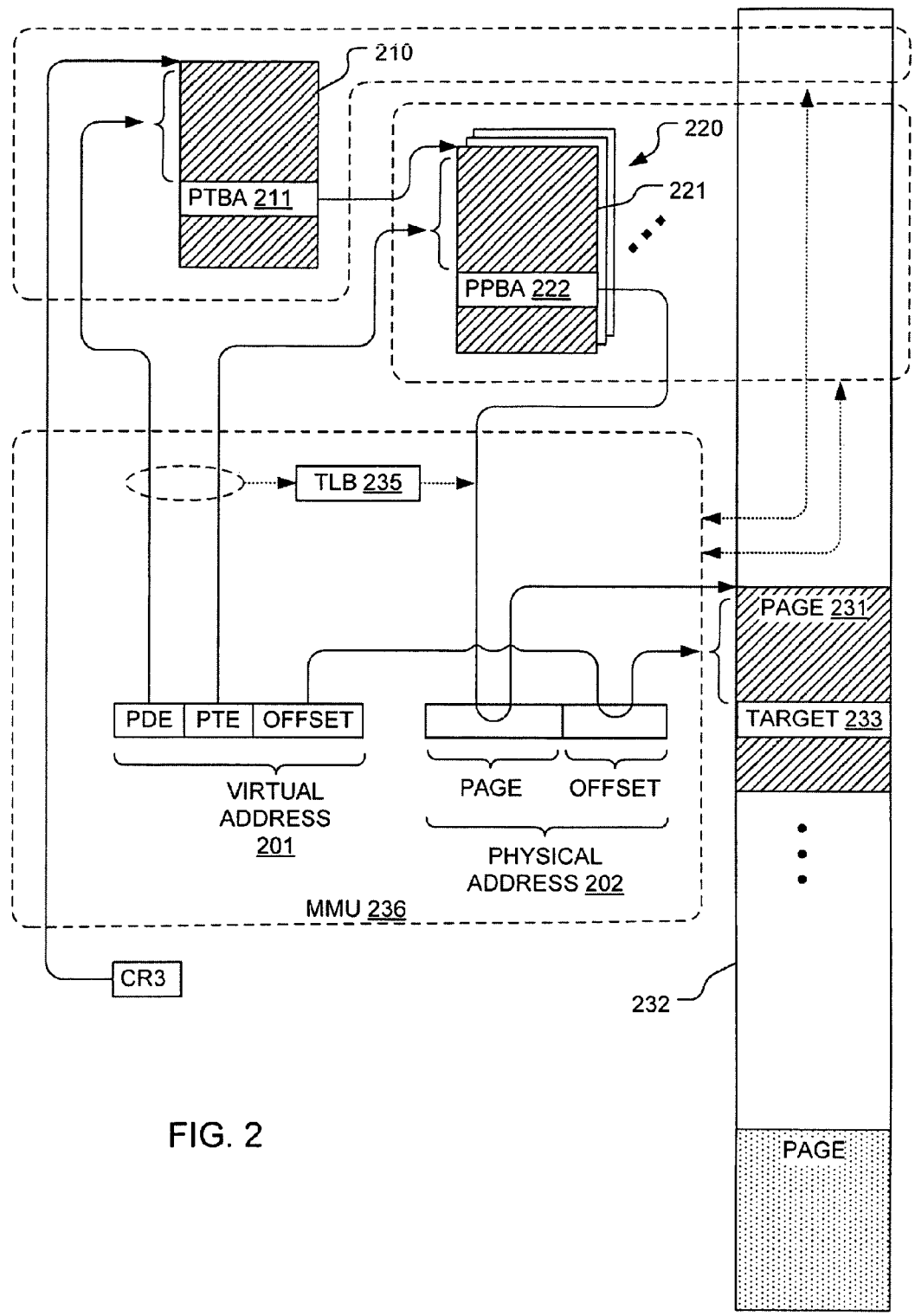
FIG. 2 illustrates an example in which virtual memory addresses are translated to addresses in a physical address space of a computational machine using page table information.

By way of example, FIG. 2 illustrates structure and use of a page mapping hierarchy typical of x86-type architectures. A 32-bit virtual address 201 includes constituent portions that are treated as a 10-bit page directory entry (PDE) index, a 10-bit page table entry (PTE) index and a 12-bit page offset (OFFSET). The respective indices are used in a two-level mapping scheme that employs a 1024-entry page directory 210, indexed using the PDE index, to retrieve a corresponding page table base address (PTBA) 211 that, in turn, identifies a 1024-entry page table 221. This page table, together with other page tables corresponding to other page directory entries, are collectively referred to as page tables 220. Page table 221 is itself indexed using the PTE index portion of virtual address 201 to identify a corresponding physical page base address (PPBA) entry 222, which in turn identifies page 231 in physical memory 232. Page and offset portions of the mapped physical address 202 are then used to access a particular target location 233 in physical memory 232 based on virtual address 201.

In the illustrated example, page directory 210, page tables 220 and individual mapped memory pages such as page 231 are all represented in physical memory 232 as 4 KByte memory pages. Typically, in modern paged virtual memory implementations, a memory management unit (e.g., MMU 236) performs the virtual-to-physical address translations either by walking the page tables (as described with reference to FIG. 2) or by retrieving cached page mappings from a translation lookaside buffer (e.g., TLB 235). Typically, an operating system maintains (often in conjunction with the MMU) contents of the page tables in correspondence with demand paging activity. The MMU uses page mappings coded therein to perform virtual-to-physical address translations in the course of memory accesses performed by a processor (not specifically shown). As is conventional in x86-type processor architectures, contents of a control register (CR3) are used to identify the page directory 210 corresponding to a current execution context and its address space.

Use of the illustrated page mappings can be understood as follows. When MMU 236 receives virtual address 201, it checks to see if there is an entry in TLB 235 that provides a mapping for virtual address 201 to a corresponding physical page number. In the illustrated context, a combination of PDE and PTE portions of virtual address 201 is considered a virtual page number. Therefore, TLB 235 maps 20-bit virtual page numbers to 20-bit physical page numbers, although other configurations are possible. Typically, TLB 235 is implemented as a content addressable store in which a subset of virtual-to-physical page number mappings are cached. If TLB 235 contains an entry that matches the virtual page number for virtual address 201, MMU 236 uses this cached mapping to obtain the corresponding physical page number. If not, MMU 236 walks the page tables.

To walk the page tables, MMU 236 identifies a page directory corresponding to the current context and indexes first into the page directory and then into a page table. For example, in the illustration of FIG. 2, the PDE portion of virtual address 201 is used as an index into page directory 210 while the PTE portion of virtual address 201 is used as an index into page table 221. More specifically, a 20-bit value retrieved from control register CR3 is used as the upper 20 bits, a 10-bit value from the PDE portion of virtual address 201 is used as the next lower address bits, and the last two address bits are set to 0 to form the 32-bit address (in physical memory 232) of PTBA entry 211. In turn, PTBA entry 211 is used to identify page table 221 and the PTE portion of virtual address 201 is used as an index thereinto. More specifically, a 20-bit value obtained from PTBA entry 211 is used as the upper address bits, a 10-bit value from the PTE portion of virtual address 201 is used as the next lower address bits, and the last two address bits are set to 0 to form the 32-bit address (in physical memory 232) of PPBA entry 222. Finally, PPBA entry 222 is used to identify mapped page 231 and the offset portion of virtual address 201 is used as an offset thereinto. More specifically, a 20-bit value obtained from PPBA entry 222 is used as the upper address bits and the 12-bit offset portion of virtual address 201 is used as the lower address bits to form the 32-bit address (in physical memory 232) of target location 233.

Page directories are typically page aligned and, in x86-type processor designs, 20 bits from control register CR3 are sufficient to uniquely identify a 4 KByte page that encodes the page directory for the current execution context. Page tables 220 and, of course, the pages themselves, are also page aligned. Therefore, 20-bit page table base addresses (e.g., PTBA 211) and physical page base addresses (e.g., PPBA 222) are also sufficient in the illustrated configuration. That said, entries in the illustrated page directories and tables are 32 bits, and the additional bits are generally available to code appropriate and desirable attributes such as validity of the entry, types of access allowed for the corresponding page, whether the corresponding page has been modified and/or referenced since loaded into physical memory 232, whether caching is disabled, whether the corresponding page must remain in physical memory 232, etc.

In general, page mapping state is dynamic and constantly changing in accordance with demand paging activity, based on context switches, and in some cases, based on explicit instructions (e.g., flush, invalidate, etc.) executed by operating system or application code. Relative to demand paging, as virtual-to-physical page translations are performed, some page mappings may indicate that corresponding data is not currently present in physical memory 232. In this case, MMU 236 generates a page fault that, once serviced, results in data being loaded into physical memory 232 and corresponding changes made in page tables 220. For example, if at the time that MMU 236 attempts to map virtual address 201, corresponding data does not actually reside in physical memory 232, PPBA entry 222 will so indicate. Corresponding data will be loaded from backing storage and PPBA entry 222 will be updated to identify the page in physical memory 232 into which the data is loaded. In this way, either initially or eventually based on operation of a page fault handler, a mapped physical page frame (here shown as physical page 231) contains data corresponding to virtual address 201. Since physical memory is finite, the preceding sequence will typically displace data that previously resided in the page frame and both PPBA entry 222 and other page mapping information corresponding to the now displaced data will also be updated.

Generally, memory management facilities of an operating system are responsible for creating and maintaining page tables 220 in memory accessible for use by an MMU such as MMU 236. MMU and/or operating system memory management facilities are generally responsible for managing contents of TLB 235 so that recently (or frequently) obtained mappings between virtual page numbers and physical page numbers are cached therein. Typically, demand paging activity will result in changes to TLB contents. However, in addition, mappings may be flushed from TLB 235, e.g., in connection with a context switch, or may be individually invalidated, e.g., when a corresponding memory page is unmapped. In general, TLB-state affecting operations are performed by MMU 236 based on its actions or in response to operations performed by operating system memory management facilities and (in some cases) application software.

For example, when a mapping for a particular virtual page number is not contained within TLB 235 and a page table walk is performed, MMU 236 typically evicts an entry from TLB 235 to free up space for a new entry for the current mapping. The virtual page number is cached in the newly available entry in TLB 235, along with the physical page number obtained based on the page table walk (and any demand paging) and certain additional attributes that code types of access allowed for the corresponding page, whether the corresponding page has been modified and/or referenced since loaded into physical memory, etc. In general, when an entry in TLB 235 is evicted, the bit indicating whether the page has been modified is typically copied from the evicted entry to the corresponding entry in page tables 220.

If operating system memory management facilities unmap a virtual page and a corresponding entry exists in TLB 235, the operating system is typically expected to modify the TLB entry to indicate that the mapping is no longer valid. Other programs, including user-level applications, may also be allowed to invalidate a TLB entry. Indeed, x86-type processor architectures provide an instruction, invlpg (virtual address), for this purpose although use of the invlpg instruction is usually restricted to kernel code. Conventionally, if a TLB entry is marked invalid, MMU 236 walks the page tables to determine a current mapping for the virtual address. The x86 architecture also provides an instruction for flushing TLB contents.

Shadow Page Mappings

One challenge in the virtualization of modern computer architectures is creation and maintenance of memory mapping information in a form often referred to as shadow page tables. In general, shadow page tables encode virtual-to-physical memory mappings usable by a memory management unit or other facility of underlying hardware in mapping memory access targets of instructions executed on behalf of a guest computation. Typically, the guest computation is aware of mappings to an apparent physical address space of a virtual machine, but is unaware of actual mappings to an address space in underlying physical memory.

Thus, while mappings encoded in shadow page tables can correspond to mappings maintained by a guest operating system in conventional page tables (e.g., guest page tables), they typically go at least one step further, completing the mapping to addresses in underlying physical memory. To understand why this further mapping is relevant, it is important to recognize that the guest operating system (or an execution context thereof) is not generally aware that it executes on a virtual machine. Accordingly, the guest operating system and its execution contexts maintain and view the guest page tables as representing operant virtual-to-physical memory mappings, even though the mapped-to "physical" addresses are really addresses in a space that is itself virtualized by the virtualization system. Such guest page table mappings can therefore be understood as mappings from Guest Virtual Page Numbers (GVPNs) to Guest Physical Page Numbers (GPPNs).

Figure 3:
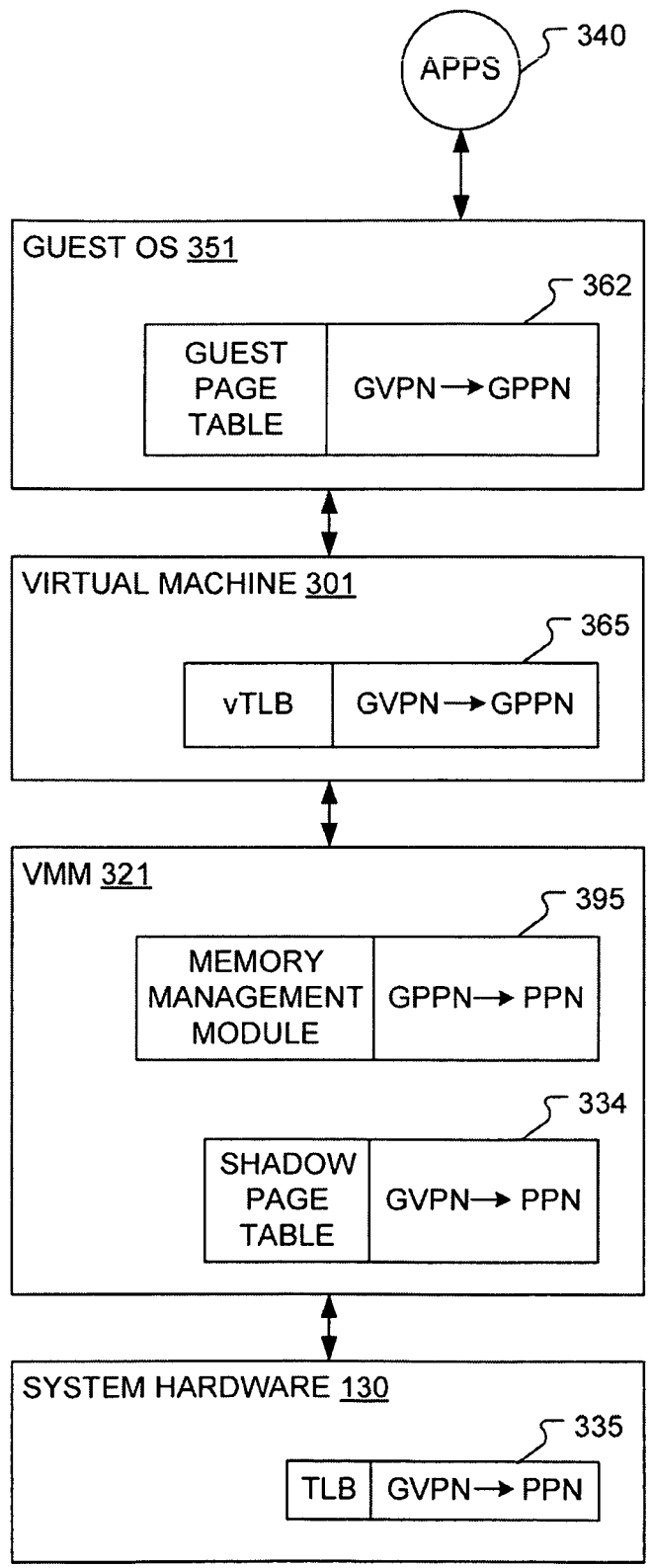
FIG. 3 depicts a distribution of page mapping facilities used to map guest virtual memory addresses to both guest physical addresses and physical addresses in the address space of an underlying physical machine.

FIG. 3 illustrates relationships between various levels of software (including virtualization system software) that execute using underlying facilities of system hardware. FIG. 3 also illustrates page mapping facilities at each level. In particular, an operating system instance (here guest OS 351) executes on a virtual machine 301 supported by virtual machine monitor (VMM) 321 using underlying facilities of system hardware 130. As is conventional, the operating system (guest OS 351) maintains page tables (e.g., guest page tables 362) that map virtual addresses in address spaces of applications 340 to apparent "physical" addresses in memory of the computational machine on which the operating system and applications apparently execute (here, virtual machine 301). These mappings from guest virtual page numbers to guest physical page numbers (GVPNs→GPPNs) appear in memory-resident page tables managed by guest OS 351 and, as is conventional for many architectures, a subset of those mappings are cached in a translation lookaside buffer (here vTLB 365).

Now, suppose that one of the applications 340 executing in coordination with guest OS 351 attempts to access a memory location having a first GVPN which is backed by what guest OS 351 (and the application) believes to be a physical memory page having a first GPPN. The GVPN→GPPN mapping is faithfully represented in guest page tables 362 and cached in vTLB 365 exported by VMM 321 as part of virtual machine 301. However, to actually address underlying physical memory in system hardware 130, further mapping is needed and employed (typically without the knowledge of guest OS 351 or applications 340).

Since the guest operating system executes in a virtual machine, this further mapping (e.g., from a GPPN to a machine physical page number, PPN) is typically provided by the virtualization system. Shadow page tables (and cached representations of entries thereof) provide an efficient mechanism for encoding mappings from GVPNs to PPNs and therefore allow the virtualization system to manage direct execution of guest code on underlying hardware, while avoiding (in most cases) a two-layer runtime mapping of memory addresses.

Shadow page table techniques are used in a wide variety of commercially-available virtualization systems, including those available from VMware, Inc. Accordingly, persons of ordinary skill in the art will appreciate, particularly based on the description herein, use of shadow page tables for runtime translation of memory addresses in a virtualization system. Conventional mechanisms by which operating system page mapping states and shadow tables are coordinated will also be understood by persons of ordinary skill. Nonetheless, for completeness, the detailed description of U.S. patent application Ser. No. 11/584,178, filed Oct. 20, 2006, entitled "ISOLATING DATA WITHIN A COMPUTER SYSTEM USING PRIVATE SHADOW MAPPINGS" and naming as inventors, Chen, Waldspurger, and Subrahmanyam is incorporated herein by reference and describes some suitable designs in the context of isolation techniques.

As illustrated in FIG. 3, the further mapping to machine PPNs is supported several ways. VMM 321 manages paging and use of underlying memory for various virtual machines that it supports for use by guest computations. In particular, memory management module 395 keeps track of the actual machine physical pages (PPNs) that are exported as apparent guest physical pages (GPPNs) and mappings (including the illustrated GPPN→PPN mapping) therebetween. Second, VMM 321 maintains shadow page tables 334 that complete the mapping from virtual addresses to apparent guest physical addresses to actual machine physical addresses (in effect, GVPN→GPPN→PPN). Since shadow page tables 334 encode operant mappings from guest virtual address space to machine physical address space (GVPN→PPN), they facilitate execution of instruction sequences (including memory accesses) of applications 340 and guest OS code directly on underlying system hardware 130. Finally, a memory management unit of underlying system hardware 130 caches a subset of these shadow page table mappings (GVPN→PPN) in its translation lookaside buffer (TLB) 335. As is typical in memory management units (MMUs) that include TLB-type translation caches, TLB 335 facilitates efficient virtual-to-physical translations of memory addresses; however, as illustrated in FIG. 3, the translations cached in TLB 335 map from guest virtual address space to machine physical address space (i.e., GVPN→PPN) and are used to translate memory addresses that appear in code executed on underlying hardware 130 in furtherance of computations of an application or of guest OS 351.

Note that, applications 340 and guest OS 351 are typically unaware of mappings in shadow page tables 334 and TLB 335. Indeed, in some embodiments, the mapping to machine physical addresses is used, in part, to isolate virtual machines and indeed, guest computations, from each other.

Figure 4:
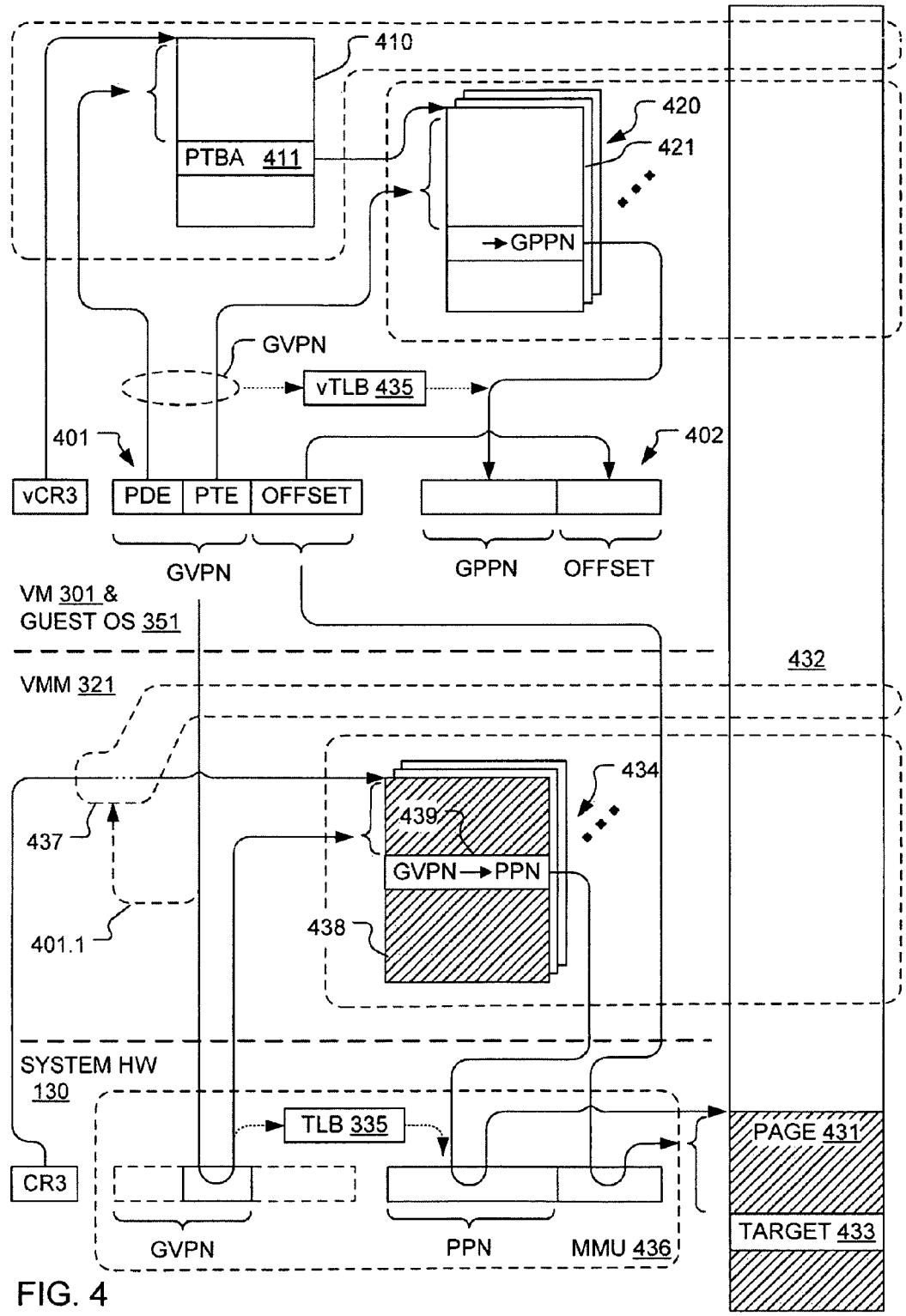
FIG. 4 illustrates (relative to the example of FIG. 2) use of shadow page tables to translate guest virtual memory addresses to addresses in the physical address space of an underlying physical machine.

FIG. 4 builds on the preceding description and illustrates (consistent with the example of FIG. 2) use of shadow pages tables to translate guest virtual memory addresses to addresses in the physical address space of an underlying physical machine. In addition, the illustration shows relations between guest page mappings and the shadow page tables that may be maintained by a virtualization system and/or underlying hardware in accordance with one or more embodiments of the present invention.

As before, the illustration assumes a structure and use context typical of page mapping hierarchies supported in conventional x86-type architectures. As before, a 32-bit virtual address includes constituent portions that can be viewed (at least as far as a guest operating system is concerned) as a 10-bit page directory entry (PDE) index, a 10-bit page table entry (PTE) index and a 12-bit page offset (OFFSET). However, since the address spaces are provided in a virtualization system, the PDE and PTE index portions can together be understood as the guest virtual page (GVPN) portion of the virtual address (hereafter, guest virtual address 401). In like manner, the page number portion that results from a two-level mapping through entries of a page directory and a page table (or directly based on a cached translation) can be understood as a guest physical page (GPPN) portion of guest physical address 402. Note that in the illustration of FIG. 4, the relevant translation lookaside buffer (vTLB 435) for (GVPN→GPPN) translations is a component of virtual machine 301 rather than the TLB (if any) implemented in a memory management unit of underlying hardware.

From the perspective of a guest operating system (e.g., guest operating system 351 running on virtual machine 301), page directory 410 is indexed using the PDE index portion of the virtual address to retrieve a corresponding page table base address (PTBA) 411 that, in turn, identifies a page table (hereafter, guest page table 421). As before, this page table, together with other page tables corresponding to other page directory entries, is collectively referenced (here, as guest page tables 420). Guest page table 421 can be indexed using the PTE index portion of guest virtual address 401 to identify a corresponding physical page base address, which in turn identifies (at least as far as the guest operating system is concerned) the guest physical page.

As before, virtual-to-physical address translations are based on page mappings maintained by the operating system. However, unlike the previous illustration (recall FIG. 2), a corresponding target location 433 in physical memory (e.g., in page 431) is actually mapped using page mapping mechanisms of VMM 321 and underlying hardware, which are hidden from guest operating system 351. More specifically, recall that in FIG. 2, page and offset portions of the mapped physical address 202 were used to access a particular target location 233 in physical memory 232 based on the virtual address 201. However, in the extended example of FIG. 4, a guest physical address (e.g., guest physical address 402) does not actually address physical memory. Instead, physical memory is addressed using page mappings coded in corresponding data structures (e.g., shadow page tables 434) maintained by VMM 321. Shadow page tables 434 correspond to guest page tables 420 but complete the mapping to machine addresses in physical memory.

Thus, in the illustration of FIG. 4, guest page directory 410, guest page tables 420, any shadow page directory 437, shadow page tables 434 and individual mapped memory pages such as page 431 are all represented in physical memory 432 as 4 KByte memory pages. However, only the contents of guest page directory 410, guest page tables 420 and the mapped pages themselves (e.g., page 431) are actually accessible to guest operating system 351. Shadow page tables 434 maintained by VMM 321 in correspondence with guest page tables 420 are hidden from guest operating system 351 and any applications executing in coordination therewith. Furthermore, while guest page directory 410, guest page tables 420 and page 431 all appear (from the perspective of guest operating system 351 and applications) to reside at addresses in guest physical address space per page mappings maintained by guest operating system 351, each actually resides at a machine physical page (PPN) not known to guest operating system 351, but instead mapped at runtime by underlying system hardware 130 (e.g., using GVPN→PPN translations cached in TLB 335).

In general, memory management unit 436 performs translations from guest virtual address space to machine physical address space either by walking shadow page tables 434 or by retrieving cached page mappings from a translation lookaside buffer (e.g., TLB 335). For simplicity, only a single-level of page tables is detailed in FIG. 4, although persons of ordinary skill in the art will appreciate that a multi-level mapping scheme (such as the two level scheme described above with reference to FIG. 2) may be employed. In some embodiments, structurally equivalent two-level mapping schemes may be employed by guest operating system 351 and VMM 321. For example, a page directory index portion 401.1 of the guest virtual page portion of guest virtual address 401 may be used (in conjunction with contents of a control register (CR3)) to identify (see generally 437) a shadow page directory entry that, in turn, identifies an appropriate one of shadow page tables 434 by which VMM 321 completes the mapping to machine physical page 431. However, more generally, the page mapping scheme and/or hierarchy employed by virtual machine 301 need not be identical to that supported by MMU 436 of underlying system hardware 130. For example, in some embodiments, greater or fewer levels of the shadow page mapping hierarchy managed by VMM 321 are used by MMU 436 for runtime translations.

In view of the above and without limitation, use of the illustrated shadow page mappings can be understood as follows. When MMU 436 receives guest virtual address 401, it checks to see if there is an entry in TLB 335 that provides a mapping for guest virtual address 401 to a corresponding machine physical page. In the illustrated context, a combination of PDE and PTE portions of guest virtual address 401 is considered a guest virtual page number. Therefore, TLB 335 maps 20-bit guest virtual page numbers (GVPNs) to 20-bit physical page numbers (PPNs), although other configurations are possible. Typically, TLB 335 is implemented as a content addressable store in which a subset of the shadow page mappings are cached. If TLB 335 contains an entry that matches the guest virtual page number for guest virtual address 401, MMU 436 uses this cached mapping to obtain the corresponding physical page number. If not, MMU 436 walks the shadow page tables 434.

To walk the shadow page tables, MMU 436 identifies the appropriate entry in shadow page table 438 using the shadow page mapping hierarchy maintained by VMM 321. For example, in an embodiment in which VMM 321 maintains a 2-level shadow page mapping hierarchy that is structurally similar to that maintained by guest operating system 351, MMU 436 identifies a shadow page directory entry (not explicitly shown) for a current execution context using (i) 20-bit contents of control register CR3 and (ii) a 10-bit index portion (PDE) of guest virtual address 401 to obtain a page-boundary aligned shadow page table base address (see 437) that, in turn, identifies shadow page table 438. Then, using another portion (PTE) of guest virtual address 401, MMU 436 indexes the appropriate entry (e.g., 439) in shadow page table 438 to obtain a 20-bit machine physical page (PPN) that, in combination with the 12-bit offset portion of guest virtual address 401, forms the 32-bit address (in physical memory 432) of target location 433.

As before, page mapping data structures are typically page aligned and, assuming an x86-type processor design for underling system hardware 130, 20 bits from a control register CR3 thereof are sufficient to uniquely identify a 4 KByte page that encodes a page directory for the current execution context. Shadow page tables 434 and, of course machine pages themselves, are likewise page aligned. Therefore, a 20-bit shadow page table base address (see 437) and 20-bits of shadow page table entry 439 are also sufficient in the illustrated configuration. That said, in a typical embodiment, entries in the shadow page mapping tables encode a larger number of bits (e.g., 32 bits or more), and some of the additional bits are used to code conventional attributes such as validity of the entry, types of access allowed for the corresponding page, whether the corresponding page has been modified and/or referenced since loaded into physical memory 432, whether caching is disabled, whether the corresponding page must remain in physical memory 432, etc. However, in addition, some of the additional bits are also available to code attributes that, in accordance with some embodiments of the present invention, facilitate delegation by VMM 321 of event tracking responsibilities to a suitably designed implementation of memory management unit MMU 436.

Support for Shadow Page Table Coherence with Guest Page Mappings

Based on the foregoing description, it will be apparent to persons of ordinary skill in the art that some mechanism is needed for maintaining correspondence between the page mappings managed by a guest computation (e.g., the guest page table 420 entries maintained by guest operating system 351 and cached vTLB 435 counterparts thereof) and the shadow page mappings (e.g., shadow page table 434 entries and cached TLB 335 counterparts) actually used by underlying hardware 130. For example, in some designs, to maintain coherence between shadow page tables and the guest page tables that back them, a virtualization system may seek to intercept guest writes to memory pages that contain guest page tables. Intercepted writes may then be given effect in both sets of page mappings.

One way to implement this technique is to have the virtualization system write-protect a range of memory addresses that covers the guest page tables. Then, an attempt by the guest to write an entry of the guest page tables will result in a write protection fault (page fault) that the virtualization system can handle. A properly implemented handler can then temporarily lift the write protection, execute the write, reestablish the write-protection, and then make a corresponding modification in the shadow page table. Sometimes this technique is described as establishing a "write trace" and can generally allow a software system to piggyback additional actions, such as for shadow data structure, on an update to a primary data structure. U.S. Pat. No. 6,961,806 to Agesen, Subrahmanyam, Devine, Rosenblum and Bugnion, entitled "SYSTEM AND METHOD FOR DETECTING ACCESS TO SHARED STRUCTURES AND FOR MAINTAINING COHERENCE OF DERIVED STRUCTURES IN VI RTU-ALIZED MULTIPROCESSOR SYSTEMS" describes the use of write tracing techniques in virtualization systems.

While tracing techniques provide an attractive mechanism for supporting various operations in a virtualization system, in at least some circumstances, the overhead introduced by taking a fault, performing the piggybacked action, and resuming may be undesirable. For example, in the case of shadow page table techniques, page fault overheads may be undesirable, particularly in comparison with executions on native hardware for which similar overhead would not be present. In this regard, it has been discovered that virtualization systems that maintain a correspondence relation between shadow page tables and the page mappings of a guest computation can, in at least some situations, profitably delegate to an underlying memory management unit or facility the tracking of memory accesses that target locations that may themselves encode guest page tables. Although a transient inconsistency may exist between shadow page tables and guest page mappings, if write accesses are recorded in a low-overhead way such as by hardware, virtualization software may then consume recorded memory access information at a time of its choosing, typically at a coherence boundary, and avoid overheads that might otherwise degrade performance and/or increase latency for certain memory accesses.

Many modern processor architectures (including x86-type architectures) tolerate imperfectly coherent elements of a virtual-to-physical page mapping hierarchy (e.g., translation lookaside buffer (TLB) states that are imperfectly coherent with states of underlying page table entries). For example, a TLB entry may become stale and therefore incoherent with respect to an updated state of a page table entry to which it corresponds. An operating system implementation is expected to interact with the virtual-to-physical page mapping hierarchy in a way that tolerates at least transient incoherence. In particular, in some architectures, coherence is guaranteed only after an explicit software TLB flush or other coherency-inducing operation (such as the invalidation of one or more targeted TLB entries) is performed.

Therefore, building on this architectural (and operating system) tolerance and referring to FIG. 4, a virtualization of such processor architectures may allow an entry of a virtual TLB (e.g., vTLB 435) to become stale, and therefore incoherent with the entry of a guest page table (e.g., guest page table 421) to which it corresponds. Furthermore, in some embodiments of the present invention, tolerance is extended to allow an entry of a shadow page table (e.g., shadow page table 438) to become incoherent (e.g., stale) with respect to the guest page table entry to which it corresponds. Although a guest operating system (e.g., guest operating system 351) would be expected to resolve the transient inconsistency between vTLB 435 entry and guest page table 421, the guest operating system is not (typically) expected to even recognize that virtualization is occurring. Therefore, a conventional operating system would not (in general) be expected to itself reestablish coherence between mappings maintained by the virtualization system (e.g., shadow page tables 434 and/or any cache thereof in a TLB 335 of underlying hardware) and guest page mappings.

Instead, in one or more embodiments of the present invention, VMM 321 coordinates with underlying hardware (e.g., MMU 436 of system hardware 130) to efficiently accumulate information that VMM 321 may later use to re-establish coherence. In general, this approach tends to avoid taxing individual memory accesses performed on behalf of a guest computation with overheads (and latencies) associated with exception and/or fault handling. Rather, some embodiments in accordance with the present invention augment shadow page mappings (e.g., those coded in shadow page tables 434 and/or any cache thereof such as in TLB 335) to identify for MMU 436 those GVPN→PPN mappings that correspond to physical memory locations that themselves encode one of guest page table 420. Then, based on the identification, cooperating facilities MMU 436 may record and make accessible to VMM 321, information sufficient to allow VMM 321 to later update its mappings (e.g., shadow page table 434) in correspondence with already completed write-type accesses to the guest page table mappings. In this way, VMM 321 may consume the recorded memory access information at a time of its choosing, typically at a coherence boundary, and overheads that might otherwise degrade performance and/or increase latency for individual memory accesses performed on behalf of the guest computation can be avoided.

Figure 5:
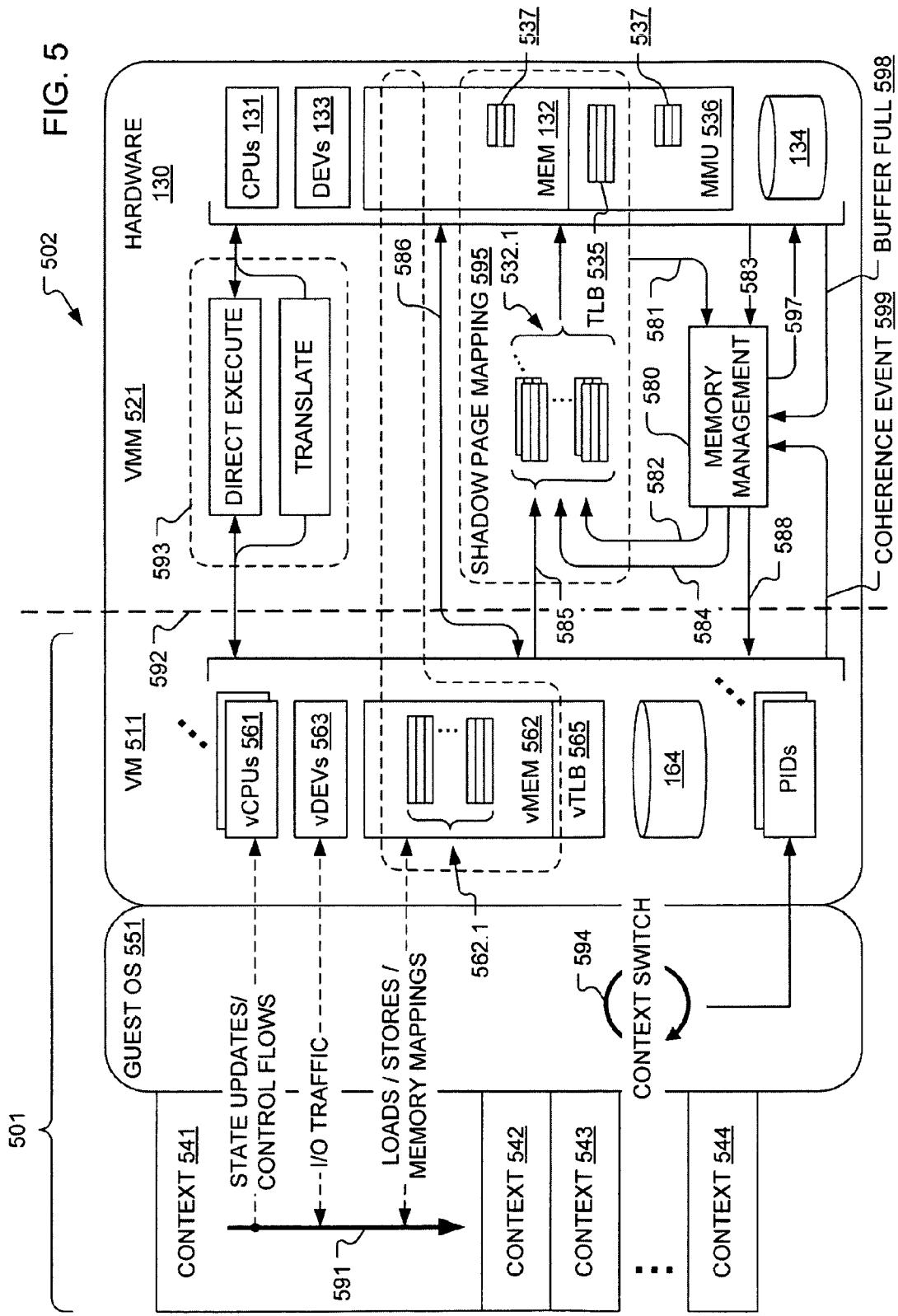
FIG. 5 is a functional block diagram illustrating components of a virtualization system that supports guest computations and in which coordination mechanisms in accordance with some embodiments of the present invention allow the virtualization system to delegate to facilities of underlying hardware recording of information for write accesses that target guest page tables.

Building on the foregoing, FIG. 5 presents a functional block diagram illustrating components of a virtualization system 502 that supports guest computations (e.g., guest OS 551 and execution contexts 541, 542, 543 . . . 544 thereof) and in which coordination mechanisms in accordance with some embodiments of the present invention allow VMM 521 thereof to delegate to facilities of underlying hardware 130 (e.g., to MMU 536) efficient recording of information for write accesses that target guest page tables 562.1. Although memory management facilities 580 of VMM 521 seek to maintain entries of shadow page tables 532.1 in a way that is generally coherent with the guest page table 562.1 entries to which they correspond, in some situations, VMM 521 allows the states to diverge as long as coherence is eventually re-established at a coherence boundary (e.g., in response to coherence event 599). In accord with this approach, memory management facilities 580 of VMM 521 do not typically trap write accesses that target guest page tables 562.1 in an attempt to piggyback corresponding updates to shadow page tables 532.1. Rather, VMM 521 allows entries of shadow page tables 532.1 to become stale, but later and asynchronously with the guest page table writes, memory management facilities 580 of VMM 521 consume (583) the memory access information recorded by MMU 536 and update (584) shadow page tables 532.1 to reestablish coherence with the guest page mappings.

As previously explained, an operating system instance, e.g., guest OS 551, coordinates execution of various execution contexts (corresponding generally to processes, threads and/or tasks) on a virtual machine, e.g., on VM 511. Thus, virtual computer 501 operates (at least from the perspective of guest OS 551 and execution contexts 541, 541, 543 . . . 544) in a manner largely analogous to a conventional hardware computer. Each virtual CPU (vCPU) typically has its own "active" context and, at any given time, an execution context (e.g., current context 541) will be current and state of at least one vCPU 561 corresponds thereto. In particular, register states, instruction pointer state, memory address translation data structures etc. exported as VM 511 are those appropriate to the current state of current context 541. Therefore, instruction sequences (including sequences of user code and system calls appropriate to current context 541) are executed on VM 511 and ordinarily result in progress of a computation associated with current context 541. In particular, individual instructions of instruction sequence 591 are executed and ordinarily result in updates to register state of exported vCPU 561.

Control flow instructions affect call/return stacks and load & store instructions affect buffer and exported memory (vMEM 562) states as well as memory address translation data structures (including GVPN→GPPN mappings coded in guest page tables 562.1 and/or vTLB 565). Note that, like other memory states exported as part of vMEM 562, guest page tables 562.1 actually reside in underlying physical memory at machine physical pages (PPNs) mapped by VMM 521 and shadow page mappings 595; however, to guest OS 551 and its execution contexts, the guest page tables 562.1 appear to reside in guest physical address space (i.e., at GPPNs) per guest page mappings (those coded in guest page tables 562.1 and/or vTLB 565) that purport to define (at least from the perspective of guest computations) virtual-to-physical address translations. Input/output operations affect the state of exported vDEVs 563 and typically transfer data through buffers in memory exported as vMEM 562.

As is typical in the art, switches between execution contexts are managed or initiated by guest OS 551 based on desired multitasking and scheduling behavior and, based on events, such execution and/or memory access stalls and interrupts or faults are supplied by VM 511. A switch between execution contexts typically results in some observable change in architectural state of the processor (whether implemented as a hardware processor or, as in FIG. 5, as vCPU 561). For example, in a processor conforming to the Intel® IA-32 microprocessor architecture, states of certain registers, e.g., Control Register 3 (CR3, also known as the Page Table Base Register, PTBR) and the Local Descriptor Table Register (LDTR) which contains the address in memory of the Local Descriptor Table (LDT), can be expected to change in correspondence with a context switch. As a result, contents of the CR3 register are often used in IA-32 architectures as a process id tracking mechanism. Of course, other instruction set architectures and implementations may provide other facilities for tracking context switches, and based on the description herein, persons of ordinary skill in the art will appreciate suitable adaptations. For example, some architectures use an explicit address space identifier (sometimes called an ASID) which may be employed in a manner similar to that described above with respect to the CR3 register of IA-32 architectures. Similarly, a guest operating system may use its own identifier for a context, e.g., a process identifier (PID). Accordingly, in some embodiments in accordance with the present invention, a virtualization system may read such an identifier directly from guest kernel memory.

In illustrated virtualization system 502, VMM 521 exports resources of hardware machine 130 as virtual machine VM 511. For simplicity of illustration, only a single virtual machine is illustrated. In general, VMM 521 manages utilization of underlying hardware structures and states, typically through a combination of direct execution, selective binary translation, mapping and/or emulation techniques. Typically, it is desirable to directly execute code that is scheduled for execution on a virtual machine (e.g., vCPU 561) on an underlying hardware processor (e.g., CPUs 131). However, for at least some instruction set architectures, binary translation or emulation of at least certain code and/or instructions may be necessary or desirable. Similarly, and as previously described, it can be desirable for memory accesses performed by code executing on the underlying hardware in furtherance of a guest computation to efficiently map to locations in underlying hardware memory (e.g., MEM 132) using shadow page mappings encoded in page tables and translation lookaside buffers (TLBs) (e.g., shadow page tables 532.1 and TLB 535) that correspond to the guest page mappings maintained in vMEM 562 as guest page tables 562.1 and/or in vTLB 565.

Typically, both the internals of any direct execution and/or binary translation mechanism 593 and the internals of any segmentation/memory management mechanisms 580 of the virtualization system are hidden from guest computations. Accordingly, a virtualization barrier 592 is illustrated in FIG. 5 to mark a somewhat arbitrary boundary between exported (and therefore visible) states, functionality and constructs of VM 511 and those states, functionality and constructs of VMM 521 (and underlying hardware 130) that are hidden from guest computations.

Practical challenges often exist for virtualization system implementations that seek to directly execute code and coherently map underlying physical memory, particularly for virtualization of processors that implement the ubiquitous x86 or IA-32 instruction set architecture. In particular, implementations must typically deal with instruction sets that include instructions (sometimes called non-virtualizable instructions) that behave differently depending on an execution mode. Classic examples include instructions such as the IRET and PUSHF instructions implemented in x86 processors which behave differently based on a privilege level. Another set of practical challenges involves implementations of segmented architectures that include segment registers which are used to help manage and provide protection for a memory address space. In particular, semantics of certain IA-32-specific segment operations lead to reversibility challenges that are described and addressed in the art (see, for example, U.S. Pat. No. 6,397,242). While elegant solutions to these problems can be non-trivial, and virtualization system embodiments in accordance with the present invention may build upon such solutions, embodiments of the present invention relate more directly to coordination between MMU 536 and memory management facilities 580 of VMM 521.

Therefore, certain aspects of virtualization system implementations are summarized and more detailed descriptions of specific implementations are incorporated herein by reference from: (a) U.S. Pat. No. 6,397,242 to Devine, Bugnion and Rosenblum describes methods for managing a mix of directly executable code and code for which binary translation may be performed; (b) U.S. Pat. No. 6,704,925 to Bugnion which, among other things, describes implementation of a dynamic binary translator mechanism and methods for maintaining coherence of a translation cache; (c) U.S. Pat. No. 6,785,886 to Lim, Le and Bugnion which, among other things, describes methods for shadowing segment descriptors in a VMM implementation and maintaining backmaps to address segment reversibility challenges; and (d) U.S. Pat. No. 7,222,221 to Agesen, Subrahmanyam and Adams which, among other things, describes methods for maintaining shadow page tables in a virtualization system and for maintaining coherence between related memory management data structures in a VM, a VMM and underlying hardware. U.S. Pat. Nos. 6,397,242, 6,704,925, 6,785,886 and 7,222,221 are therefore each incorporated herein by reference and persons of ordinary skill in the art will appreciate, based on the description herein, virtualization system implementations that build upon code execution/translation methods and/or segment/memory management virtualization methods described in detail in any of the incorporated patents.

Notwithstanding the foregoing, persons of ordinary skill in the art will readily understand embodiments of the present invention with reference to a simplified view of VMM operations presented in FIG. 5. For example, in the illustration of FIG. 5, VMM 521 provides code execution facilities 593 (using any suitable mechanism including but not limited to those described in the above-incorporated patents). In general, code execution facilities 593 allow certain code to execute directly on underlying hardware in furtherance of the computation executing on exported vCPU 561 while typically supporting at least some method (e.g., a binary translation method, hardware assisted virtualization or other trap and emulate methods, etc.) for executing alternative or modified instruction sequences when needed or when desirable. In general, hardware-assisted virtualization methods include those extensions to 32-bit and 64-bit x86 architecture commonly known as VT (Intel® Virtualization Technology) and AMD-V™ (AMD Virtualization), which provide hardware support for trap and emulate methods whereby a VMM may specify those events that will cause the hardware to exit guest execution and trap into the VMM.

Memory management mechanisms 580 employed by VMM 521 to handle segmentation and memory management can support a VM-specific set of segment registers, TLB entries (e.g., vTLB 565) and page table hierarchies (e.g., guest page tables 562.1) for use by guest computations, while maintaining a generally coherent set of shadow page mappings 595 (GVPN→PPN) for use by MMU 536 in actually mapping memory addresses used in the course of code executed (by code execution facilities 593) in furtherance of the guest computations. As with code execution facilities 593 described above, shadow page mappings 595 are used to faithfully present a model consistent with the machine virtualized.

Turning now to memory mapping and paging mechanisms of virtualization system 502, as memory access instructions are executed on underlying system hardware 130 in furtherance of a current execution context 541 of guest OS 551, addresses in guest virtual address space are mapped to machine physical addresses (i.e., GVPN→PPN) in accord with shadow page mappings 595. Often, TLB 535 will cache the appropriate translations and the cached translation will indicate that the corresponding physical page is in memory. If so, data is retrieved from (586) or written to (586) the addressed location in memory 132. If TLB 535 does not presently cache the corresponding translation, MMU 536 consults shadow page tables 532.1 to obtain the appropriate mapping and, if the appropriate mapping is found, updates its cache (TLB 535) and the access proceeds, retrieving from (586) or writing to (586) the addressed location in memory 132.

In some cases, a matching entry may appear in shadow page mappings 595, but the corresponding mapped-to physical page (PPN) may not be present in memory 132. For example, the corresponding physical page may have been evicted from memory 132 in accord with demand paging activity of VMM 521. In such case, memory management module 580 handles the resulting fault (581) and coordinates with MMU 536 to bring the corresponding page into physical memory. Note that handling of such a fault is typically hidden from guest OS 551. Memory management module 580 updates (582) shadow page mappings 595 in correspondence with the new (or now valid) mapping (GVPN→PPN) and the access proceeds, retrieving from (586) or writing to (586) the addressed location in memory 132. Finally, in some cases, there may be no corresponding mapping in shadow page tables 532.1. If there is a corresponding mapping in the guest page tables 562.1, a corresponding entry may be made in the shadow page mappings 595, and processing may continue as described above. Otherwise, if there is no corresponding mapping in the guest page tables 562.1, memory management module 580 may pass (588) the fault (581) to VM 511 for handling in accord with memory management facilities of guest OS 551.

Persons of ordinary skill in the art will recognize that the basic operation of memory mapping and paging mechanisms just described is largely conventional (at least as far as virtualization systems are concerned) and any of a variety of implementations, variations, modifications and/or extensions of these basic memory mapping and paging mechanisms may be employed if desired. Nonetheless, the basic memory mapping and paging mechanisms provide a useful and concrete descriptive context in which to explain further extensions that facilitate coordination between memory management module 580 of VMM 521 and MMU 536 in accordance with some embodiments of the present invention.

First, as previously noted, guest page tables 562.1 are themselves represented in memory 132. Therefore, like other memory accesses performed in the course of guest computations, access to guest page mapping information (including writes to guest page tables 562.1 performed by, or for, guest OS 551 in the ordinary course of its paging behavior and context switching) involve address translations (GVPN→PPN) performed by MMU 536 (potentially in cooperation with memory management module 580 of VMM 521). As a result, identifiable subsets of the entries of shadow page tables 532.1 and of translations cached in TLB 535 map to corresponding pages in memory 132 that contain guest page tables 562.1. To facilitate delegation of recording responsibilities for write accesses that target guest page tables 562.1, those entries of shadow page mappings 595 that encode the subset of GVPN→PPN translations for pages that themselves encode guest page tables 562.1 are marked using an associated indication or bit. Conveniently, many page table and TLB entry codings include extra positions or bits that can be designated and used (in embodiments of the present invention) as a "traced write" indication to direct MMU 536 to record information about a write to a guest page table, where the recorded information is sufficient to later allow memory management module 580 of VMM 521 to make a corresponding modification to a corresponding entry of shadow page tables 532.1. In implementations where there are no extra positions or bits that can be used for "traced write" indications, persons of skill in the art will understand other means by which to record such indications, such as by reusing one or more bits that were intended for another purpose, by extending the entries in the shadow page tables 532.1, or by maintaining traced write indications separately from the shadow page tables 532.1. Typically, memory management module 580 sets the "traced write" indication for particular entries of shadow page tables 532.1 when shadow page mappings 595 are created, initialized or updated.

Second, storage is provided in system hardware 130 for the buffered write information. Typically, such storage 537 (i) resides in physical memory (e.g., either at a fixed location in memory 132 or in a location indicated by a software-visible register), (ii) is provided using registers or other storage of MMU 536 or (iii) resides in a separate address space possibly accessed via special instructions.

Third, MMU 536 is adapted to recognize and act upon "traced write" indications that it encounters in the course of address translations it performs using shadow page mappings 595. In general, MMU 536 may encounter a "traced write" indication coded in association with a matching GVPN→PPN translation in TLB 535 or in an entry of shadow page tables 532.1 encountered during a page table walk. When MMU 536 detects (in the course of its virtual-to-physical address translation using mappings coded in shadow page tables 532.1 and/or TLB 535) a write access to a page which is marked for "traced write," it records in storage 537 information sufficient for the memory management module 580 to later identify those entries of shadow page tables 532.1 to be updated in correspondence therewith. Information recorded in storage 537 also allows memory management module 580 to ascertain content of updates to be introduced in correspondence with the guest page mappings. For example, in some embodiments, the recorded information includes target address and size of the write. In some embodiments, the recorded information includes an encoding of the content of the update. In some embodiments, the recorded information includes an encoding of guest page mapping state before and after the write access.

Finally, memory management module 580 is configured to consume (583), in response to a coherence event 599, the information previously recorded in storage 537. As previously described, in some architectures, transient incoherence between entries of a TLB and backing page tables is tolerated and coherence is guaranteed only after an explicit software-initiated TLB flush or other coherency-inducing operation (such as the invalidation of one or more targeted TLB entries) is performed. Thus, an implementation of VMM 521 that virtualizes such an architecture may both (i) extend this tolerance to transient incoherence between entries of the guest page tables 562.1 on one hand and corresponding entries of shadow page tables 532.1 and/or TLB 535 on the other hand; and (ii) treat TLB flush and/or entry invalidation operations performed by guest OS 551 (but actually implemented by VMM 521 for virtual machine 511) as coherence event(s) 599.

In some embodiments, and particularly if storage 537 has a fixed capacity, MMU 536 may trap out to a handler of memory management module 580 in order to drain the recorded information. Thus, in the illustration of FIG. 5, memory management module 580 also consumes (583) contents of storage 537 in response to a buffer full indication 598. In each case (i.e., whether triggered in response to coherence event 599 or buffer full indication 598), based on information retrieved from storage 537, memory management module 580 ascertains and applies corresponding updates (584) to shadow page tables 532.1.

For example, in embodiments in which recorded information includes target address (in memory 132) and size of a previously completed write to one of guest page tables 562.1, the information previously written to an entry (or entries) of a guest page table can simply be read from the entry (or entries) and corresponding updates made to corresponding entries of shadow page tables 532.1. Alternatively, in embodiments that further record content of the update, similar information may be read from storage 537. In either case, page attribute updates can typically be propagated, with possible modification(s), to the corresponding entry of shadow page tables 532.1, while an updated GPPN (e.g., as a result of a remapped virtual page) can be further mapped (using GPPN→PPN mappings maintained by VMM 521) to provide the corresponding PPN for propagation to the corresponding entry of shadow page tables 532.1.

In some embodiments in which storage 537 has a fixed capacity, VMM 521 uses an architected hardware feature (e.g., a flag, register state, signal, etc.) to indicate (597) to MMU 536 that contents of storage 537 have been consumed (or partially consumed), and that MMU 536 may resume filling entries of storage 537 as additional pages marked for "traced write" are written. Note that while updates to shadow page tables 532.1 are (in effect) buffered, the original writes to guest page tables 562.1 recorded by MMU 536 will typically have already been completed before coherence event 599 or buffer full indication 598 triggers a retrieval of buffered write information from storage 537.

Figure 6:
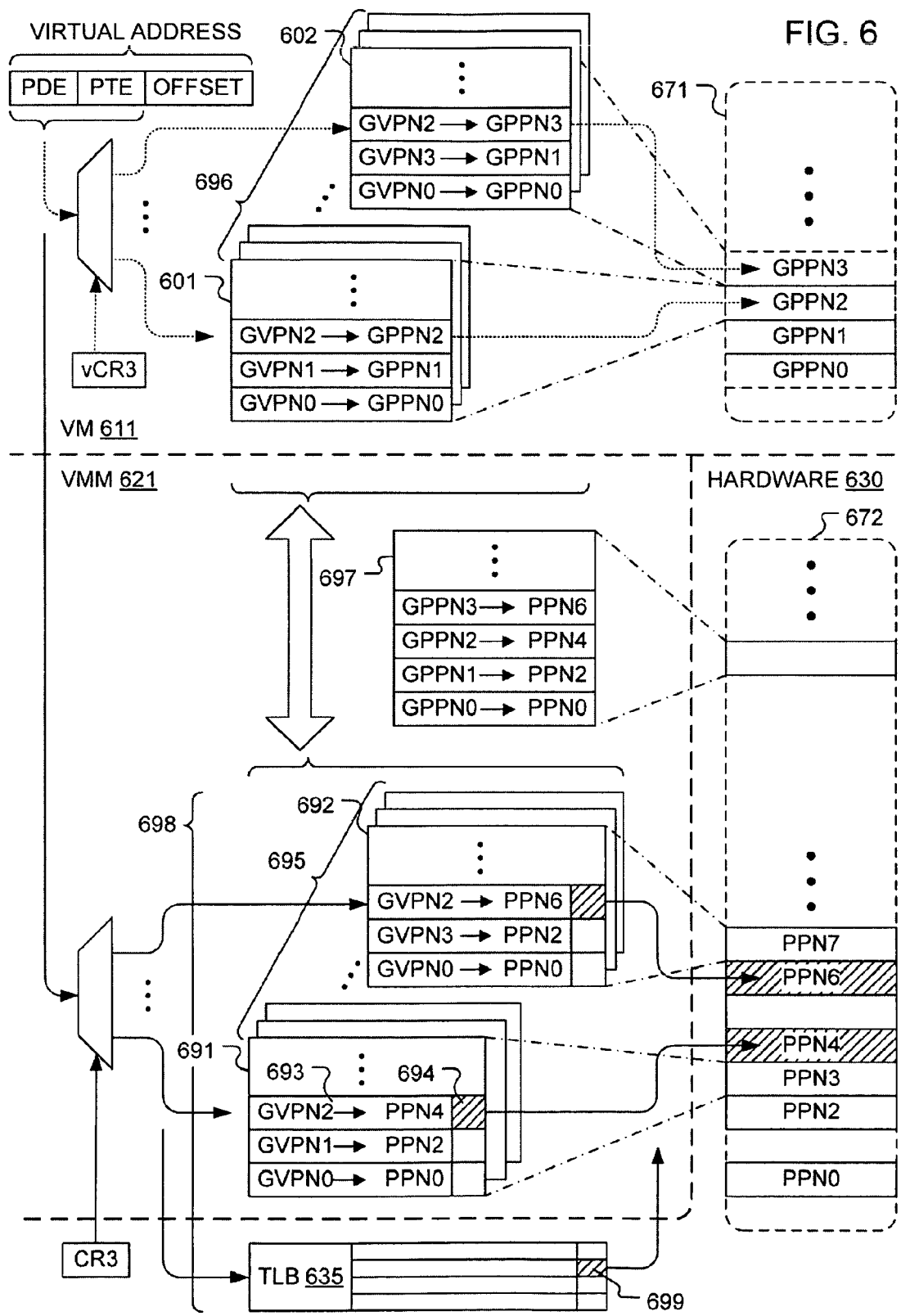
FIG. 6 illustrates mappings of guest virtual memory addresses via guest and shadow page tables for which coherence may be managed using techniques in accord with some embodiments of the present invention.

FIG. 6 illustrates mappings of guest virtual memory addresses via guest and shadow page tables for which coherence may be managed using techniques in accord with some embodiments of the present invention. For clarity of illustration, operation of any first-level lookup (e.g., lookup of a page table base address, PTBA, using a PDE portion of a virtual address) is abstracted so that guest page tables 696 and shadow page tables 695 can be viewed (at least for the sake of illustration) as full enumerations of single-level translations for respective execution contexts and without regard to any translation caching facilities exported as part of a virtual machine (e.g., without regard to facility such as vTLB 435 or vTLB 565). In this way, FIG. 6 simplifies and abstracts features previously illustrated and described with reference to FIGS. 4 and 5. Nonetheless, persons of ordinary skill in the art will readily understand the concepts and designs illustrated and, thereupon, will readily appreciate their application to page mapping constructs and designs that may, in any particular implementation, include additional levels of complexity and/or translation caching. Indeed, the simplification/abstraction of FIG. 6 is intended to improve clarity for certain details that are otherwise difficult to illustrate while avoiding potentially obfuscatory aspects of some implementations.

Thus, from the perspective of FIG. 6, a context identifier (e.g., exported control register vCR3 or machine control register CR3) is selective for an appropriate guest and shadow page table. Guest page tables 696 encode (for virtual machine 611 and any guest computation executing thereon) mappings from guest virtual page numbers to guest physical page numbers (GVPN→GPPN), while shadow page tables 695 encode mappings from guest virtual page numbers to machine physical page numbers (GVPN→PPN) for use by underlying hardware (not specifically shown) in completing virtual-to-physical address translations relative to code that VMM 621 executes on underlying hardware in furtherance of the guest computations.

Two page tables of guest page tables 696 are illustrated in somewhat greater detail. In particular, guest page table 601 encodes page mappings (e.g., GVPN0→GPPN0, GVPN1→GPPN1, GVPN2→GPPN2 . . . ) for a first execution context, while guest page table 602 encodes page mappings (e.g., GVPN0→GPPN0, GVPN3→GPPN1, GVPN2→GPPN3 . . . ) for a second execution context. Note that, in general, a virtual page in the virtual address space of two different execution contexts may map to the same, or to different, guest physical pages. Similarly, and again in general, different virtual pages in the virtual address space of different execution contexts may map to the same guest physical page. Corresponding shadow page tables 695 are also illustrated. In particular, shadow page table 691 encodes mappings to machine physical pages (e.g., GVPN0→PPN0, GVPN1→PPN2, GVPN2→PPN4 . . . ) for memory accesses performed on behalf of the first execution context, while shadow page table 692 encodes mappings to machine physical pages (e.g., GVPN0→PPN0, GVPN3→PPN2, GVPN2→PPN6 . . . ) for memory accesses performed on behalf of the second execution context.

As previously noted, guest page tables themselves reside in memory, therefore some mappings encoded in guest page tables 696 serve to map to the guest physical pages in which the guest page tables appear to reside (from the perspective of guest computations for which only guest physical address space 671 is apparent). Correspondingly, mappings encoded in shadow page tables 695 serve to map to the machine physical pages (in machine physical address space 672) in which the guest page tables actually reside. For example, in the illustration of FIG. 6, guest page table 601 apparently resides at guest physical page GPPN2 and, consistent with the GPPN→PPN mappings 697 maintained by VMM 621, actually resides at machine physical page PPN4. Similarly, guest page table 602 apparently resides at guest physical page GPPN3 and actually resides at machine physical page PPN6.

So, if a guest operating system were to execute a write instruction that targeted a location in guest page table 601, that write (apparently targeting guest physical page GPPN2) would, consistent with shadow page mapping techniques detailed herein and the illustrated GVPN→PPN mappings coded in shadow page table 691, actually resolve to machine physical page PPN4. A memory management unit of underlying hardware 630 (recall MMU 536, FIG. 5) would be expected to perform the appropriate page translation using a mapping found in shadow page mappings 698 (i.e., using the GVPN2→PPN4 entry 693 in shadow page table 691 or using a corresponding cached translation in TLB 635) and, in doing so, would encounter a traced write indication that identifies the mapped physical page as one containing guest page table information. As previously described, in some embodiments of the present invention, an associated "traced write" indication (e.g., attribute 694 coded in association with entry 693 of shadow page table 691 or a corresponding attribute 699 in TLB 635) is used to direct underlying hardware to record information sufficient to later allow VMM 621 to make a corresponding modification to a corresponding entry of shadow page table 691.

Operational Examples with Hardware Assistance

Figure 7:
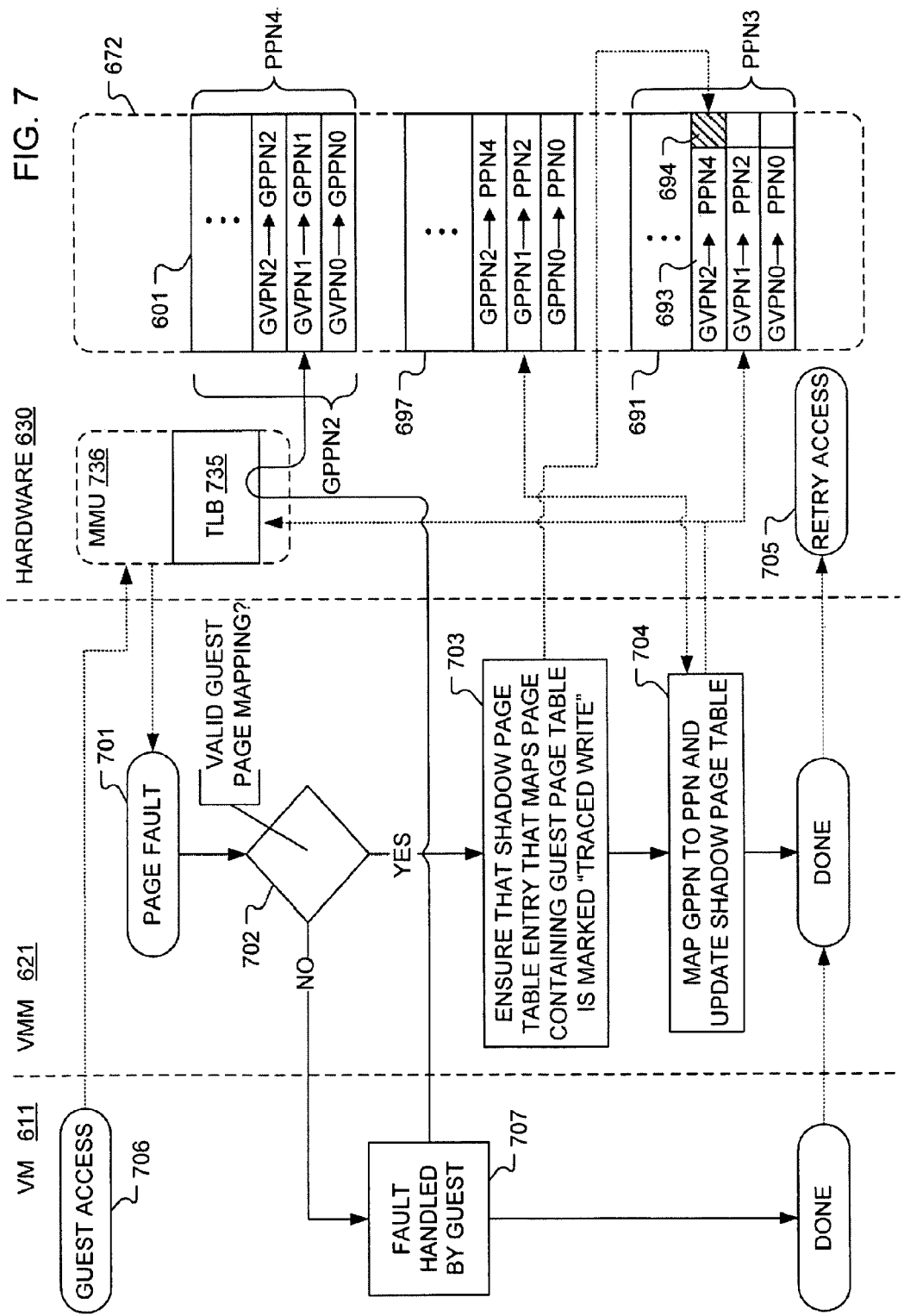
FIG. 7 illustrates operation of a virtualization system handling of a page fault situation in which a traced write indication may be initially set in accord with some embodiments of the present invention.
Figure 8:
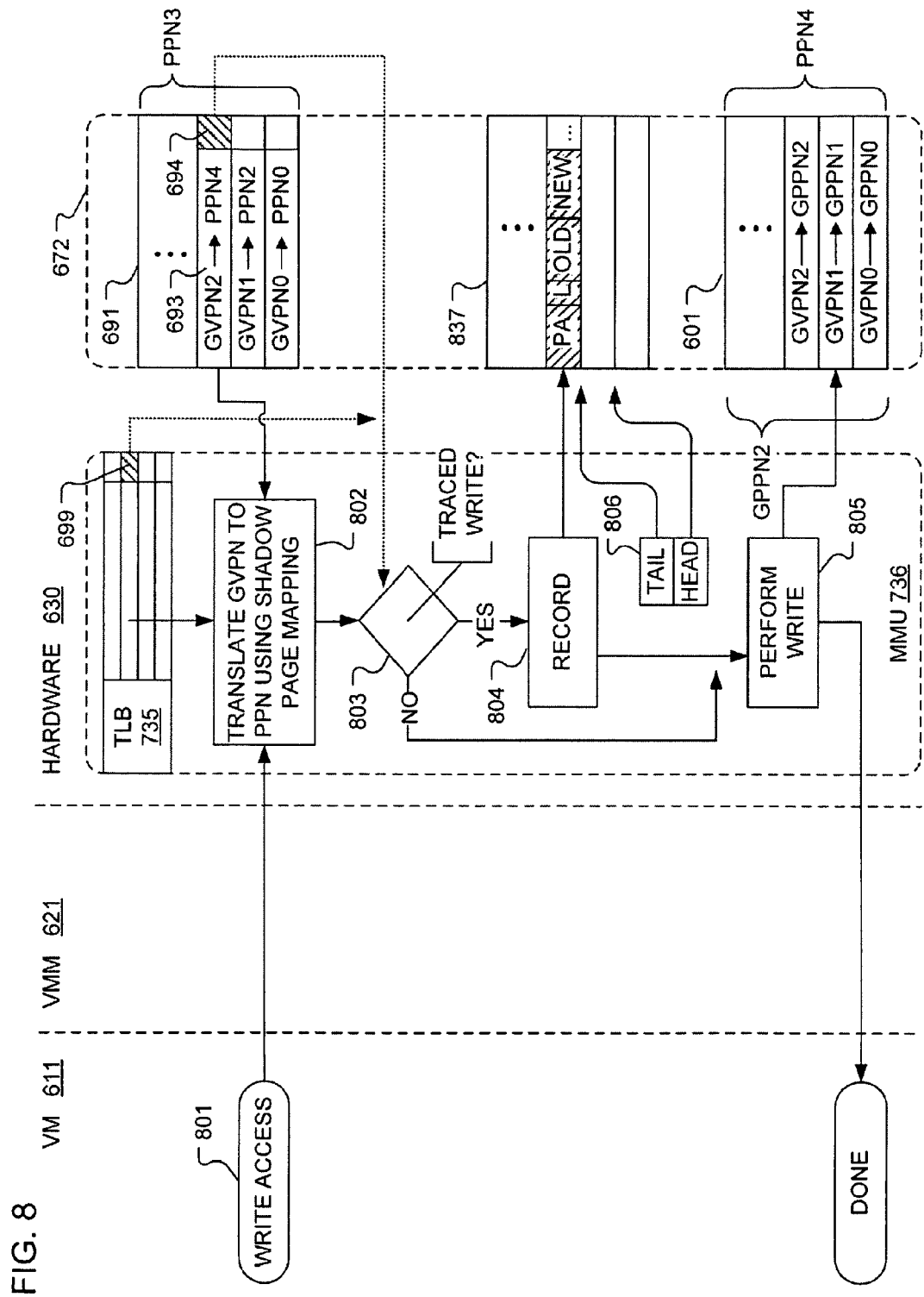
FIG. 8 illustrates operation of various components of memory management unit in connection with virtual-to-physical address translation for a write access that targets a location in physical memory for which shadow page mappings indicate that information should be buffered for later incorporation into shadow page tables. In particular.
Figure 9:
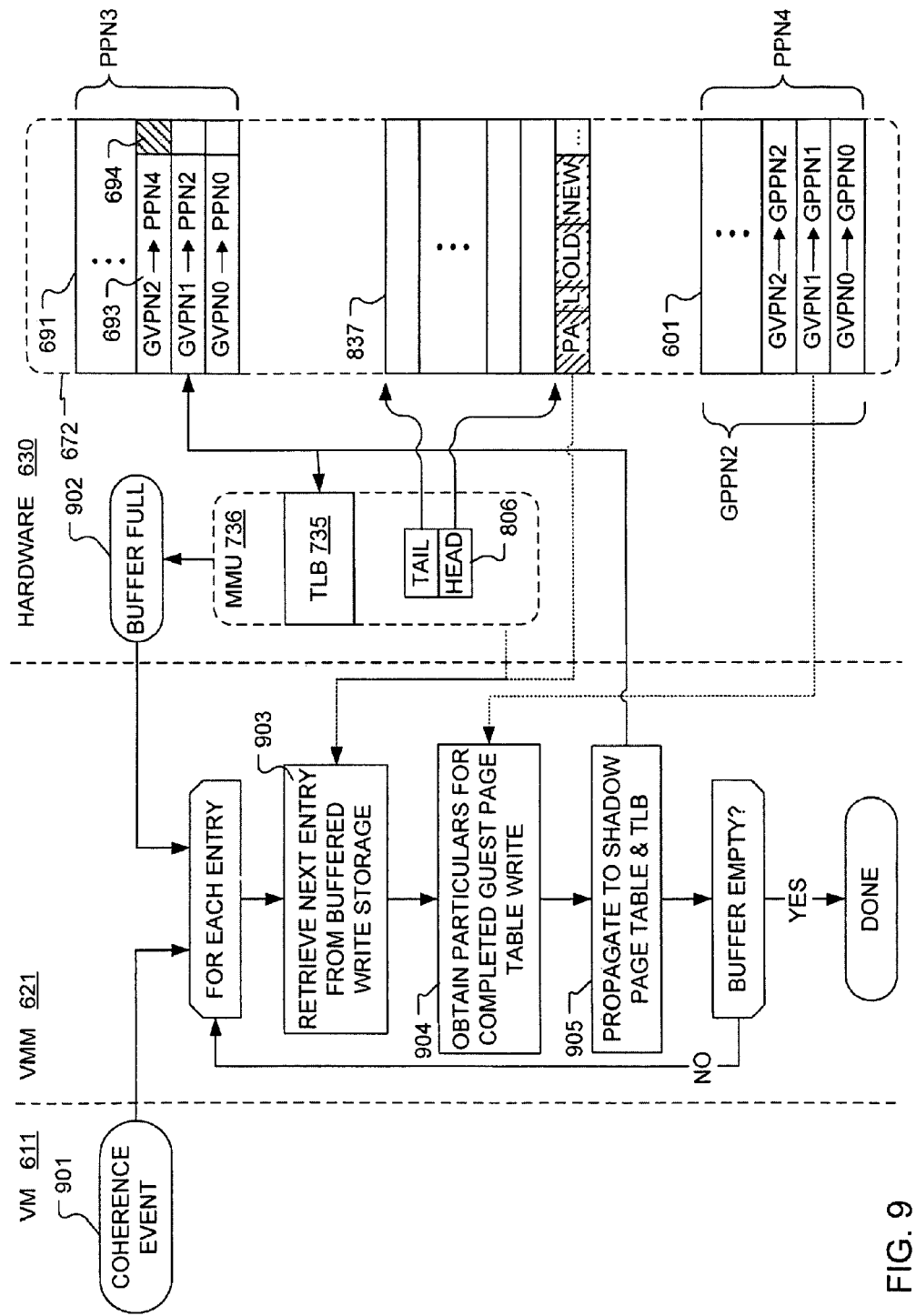
FIG. 9 illustrates operation of a virtualization system as it consumes contents of a buffer in which information has been recorded for its use. In particular.

Building on the mapping state shown in FIG. 6, FIGS. 7, 8 and 9 illustrate cooperative operation of virtualization software embodiments and hardware system embodiments in accordance with the present invention(s). In particular, FIG. 7 illustrates operation of VMM 621 in the handling of a page fault in which a traced write indication may be initially set. FIG. 8 illustrates operation of various components of hardware system 630 (particularly an MMU thereof) in connection with virtual-to-physical address translation for a write access that targets a location in physical memory for which shadow page mappings indicate that information should be buffered for later incorporation into shadow page tables. Finally, FIG. 9 illustrates operation of VMM 621 as it consumes contents of such a buffer and propagates page mapping information to a shadow page table in connection with a coherence event or buffer full indication.

Turning first to FIG. 7, virtualization system software (e.g., VMM 621) maintains shadow page tables in coordination with guest page mapping states. To facilitate delegation of actions to underlying hardware, VMM 621 ensures that shadow page table entries that map pages that themselves contain guest page tables (e.g., physical page PPN4), are marked with a "traced write" indication. In general, traced write indications may be associated with each of the shadow page mappings corresponding to guest page tables for a given execution context at any convenient point in the operation of VMM 621. For example, at least an initial set of shadow page table entries may be marked upon creation of the context. However, more generally, new page mappings are added in the course of page fault handling, so it makes sense to explain techniques for marking with a "traced write" indication in the course of page fault handling.

In the illustrated virtualization system and situation, a memory access 706 is attempted by a guest computation, but no valid shadow page mapping exists. A page fault 701 results and is initially handled by VMM 621. VMM 621 first checks (702) to see if guest page tables contain a valid mapping for memory access 706. If so, then the fault is based on the paging state of VMM 621, and it can be handled generally without involvement of a guest operating system executing on virtual machine 611. Since the valid mapping in the guest page tables may have been recently created, and since VMM 621 will have just used a shadow page mapping (e.g., that encoded in physical page PPN3 or a cached translation from TLB 735) to access the guest page table (e.g., that encoded in machine physical page PPN4), this is a convenient time to ensure (703) that a "traced write" indication 694 is associated with the corresponding entry 693 of the shadow page table. However, more generally, appropriate traced write indications may be set in any manner convenient to a particular implementation of VMM 621. For many implementations, if a "traced write" indication has not yet been set for a given shadow page table entry 693 corresponding to a guest page table, then some other method should generally be used to maintain coherency between the guest page table and corresponding entries in a shadow page table or hardware TLB, such as the mechanism using write-protection traces described above in connection with U.S. Pat. No. 6,961,806.

Next, VMM 621 maps (704) the guest physical page for the faulting access 706 to a machine physical page. If necessary, a new mapping may be created in any manner consistent with an operative memory model implemented by VMM 621. Often, an appropriate mapping will already exist (e.g., in GPPN→PPN mappings 697) but data for the mapped page may need to be loaded into physical memory 672 from backing storage. Paging operations are well understood by persons of ordinary skill in the art, and VMM 621 may implement any of a variety of paging models. Once the appropriate data has been loaded, an existing entry of shadow page table 691 may be marked as valid or, if page fault handling resulted in a new GPPN→PPN mapping, new entries may be created in both shadow page table 691 and mappings 697. TLB 735 may also be updated at this time. At this point, page fault handling by VMM 621 is complete and faulting access 706 may be retried (705).

Note that, if check 702 does not identify a valid guest page mapping, page fault 701 is forwarded for handling (707) in any conventional way by the guest (e.g., by a guest operating system executing on virtual machine 611). In general, such handling will update the state of guest page tables and potentially load data into physical memory 672 from backing storage. As with VMM 621, any of a variety of memory and/or paging models may be implemented by the guest. After handling (707) by the guest, the faulting access 706 may be retried (705), whereupon another page fault may be taken. However, a valid guest page mapping should now exist and further handling by VMM 621 is as previously described.

Turning now to FIG. 8, operation of underlying hardware 630 is described in greater detail in connection with virtual-to-physical address translation performed for a write access 801 that targets a location in physical memory for which the relevant shadow page mapping codes a traced write indication signifying that information should be buffered for later incorporation into shadow page tables. In particular, FIG. 8 illustrates operation of an MMU 736 in accordance with some embodiments of the present invention, which records information in a memory-resident buffer for later consumption by VMM 621.

As previously described with reference to FIG. 4, MMU 736 translates (802) guest virtual addresses used in code executed in furtherance of a guest computation using a matching translation cached in TLB 735 or, if no cached translation is found, by walking shadow page tables to obtain the appropriate GVPN→PPN mapping. In the situation illustrated in FIG. 8, the relevant shadow page mapping corresponding to write access 801 is to physical page PPN4 as coded in entry 693 of shadow page table 691. MMU 736 checks (803) for an indication (e.g. traced write indication 699 or 694) coded in association with the relevant shadow page mapping in TLB 735 or shadow page table 691. If the indication is present, MMU 736 records (804) information that will allow VMM 621 to later, and asynchronously, incorporate corresponding updates into one or more entries of shadow page table 691. Eventually, write access 801 is performed (805) and the targeted entry of guest page table 601 is updated.

In the illustration of FIG. 8, target physical address PA, size L, prior state OLD and new state NEW are all written to storage organized as queue 837 maintained in physical memory 672. However, more generally, the information recorded (804) by MMU 736 need only identify the target of the write sufficiently to allow VMM 621 to later ascertain (e.g., by accessing the targeted guest page table 601 at physical page PPN4 in physical memory 672) contents of the write. In some embodiments, MMU 736 records target physical address PA and size L in the entries of a queue. Note that in the illustrated configuration, the storage is organized as a queue that resides in memory and MMU 736 maintains head and tail pointers 806 to facilitate addition of new entries and consumption of those buffered. However, more generally any suitable data structure or organization may be employed. In some embodiments, storage is maintained in registers of MMU 736. In some embodiments, storage appears at a predetermined address in physical memory 672 or in a private address space. In some embodiments, available storage is finite and MMU 736 monitors for a buffer full state. Note that for ease of illustration, FIG. 8 shows an ordering of operations in which recording (804) precedes completion (805) of write access 801; however, the opposite ordering (or some other sequence) may be appropriate or desirable in some embodiments.

Finally, FIG. 9 illustrates operation of VMM 621 as it consumes contents of the previously described memory-resident queue 837 in which information has been recorded (e.g., by MMU 736) for later update of corresponding entries of shadow page tables. In particular, FIG. 9 illustrates propagation of page mapping information to a shadow page table entry 693 in connection with a coherence event 901 or buffer full indication 902.

As previously described, in virtualizations of x86-type architectures, typical coherence events include an explicit TLB flush or other coherency-inducing operation (such as the invalidation of one or more targeted TLB entries) performed by guest software executed on virtual machine 611. In some cases, coherence events may coincide with a context switch performed by a guest operating system.

In general, the set of events for which any particular implementation of VMM 621 chooses to enforce or re-establish coherence between shadow page tables mappings and underlying guest page table states is a matter of design choice. However, in some embodiments, the set of operations, events or states treated as coherence events will correspond to those which the processor architecture virtualized defines as requiring coherence between page table states and cached representations thereof (e.g., in a TLB).

Responsive to either coherence event 901 or buffer full indication 902 conveyed to VMM 621 in any suitable way, VMM 621 begins to retrieve (903) entries from storage provided by underlying hardware 630 for buffered write information. In general and as previously noted, storage can take any of a variety of forms, including that of the illustrated memory-resident queue 837 for which MMU 736 maintains head and tail pointers 806 to facilitate addition of new entries and consumption of those recorded. As before, in the illustrated configuration, entries of queue 837 code target physical address PA, size L, prior state OLD and new state NEW for previously completed write accesses that targeted pages in physical memory 672 in which guest page tables reside (e.g., physical page PPN4 containing guest page table 601). However, more generally, depending on the particular implementation of queue 837 and VMM 621, greater or lesser information content may be coded in entries of queue 837. For example, in some embodiments, target physical address and size may be sufficient to allow VMM 621 to ascertain the particulars of a previously completed write to a guest page table.

In the illustration of FIG. 9, VMM 621 obtains (904) particulars for a completed guest page table write using target physical address PA and size L to retrieve relevant information directly from the previously written page table entry. In other embodiments, as described above, the prior state OLD and new state NEW of the guest page table entry may be obtained directly from the entry in the queue 837. Then, based on the obtained information, VMM 621 propagates (905) corresponding updates to shadow page table 691. In general, corresponding updates may include, for an entry in which a mapped-to guest physical page (GPPN) has been updated, propagation of the corresponding mapped machine physical page (PPN), if any, to the corresponding entry of shadow page table 691. In some cases, mapping of a new machine physical page (PPN) may occur in the ordinary course of a subsequently handled page fault. In some cases, corresponding updates may include marking a corresponding entry of shadow page table 691 as invalid, and thereby eliminating incoherence. In some cases, corresponding updates may include propagation of updated page attributes to a corresponding entry of shadow page table 691. In some implementations, when an entry in a guest page table is changed from indicating that the virtual memory page is "not present" in guest "physical" memory to indicating that the virtual memory page is "present" (an "NP to P change"), the guest OS does not need to flush the vTLB or invalidate relevant vTLB entries. However, the corresponding entry in the shadow page table 691 should be updated, as appropriate, to maintain coherency. When a page fault occurs related to this now "present" guest physical page (PPN), the shadow page table 691 may be updated to reflect the change made to the corresponding entry in the guest page table. Because the shadow page table 691 is updated in response to a page fault instead of an ordinary coherence event, such as a TLB flush or an invalidation of one or more TLB entries, the queue 837 may also be handled in a special manner relative to NP to P changes. For example, page faults involving an NP to P change in a guest page table may be treated as another coherence event, and all the entries in the queue 837 may be processed in response to the page fault. Alternatively, in addition to updating the corresponding shadow page table entry in response to a page fault associated with a NP to P change, the VMM 621 may also delete information related to the NP to P change in the queue 837, but leave all other entries in the queue 837 for processing in response to an ordinary coherence event. As another alternative, the VMM 621 may leave information about the NP to P change in the queue 837, but ignore this information on a subsequent coherence event. As yet another alternative, the MMU 736 may simply skip writing any information in the queue 837 in response to such a NP to P change. In general, any of a variety of corresponding updates may be appropriate given operative guest-shadow page table coherence criteria established for VMM 621.

Virtualization System Technology and Variations

Based on the foregoing, persons of ordinary skill in the art will appreciate a variety of strategies by which a virtualization system can coordinate with underlying hardware to efficiently accumulate and process information by which the virtualization may re-establish coherence. In general, the described techniques may be exploited in a variety of virtualization system designs including those now reviewed. In addition, in some embodiments, underlying hardware configurations may be adapted for use with such virtualization system designs.

As is well known in art, a virtual machine (VM) is a software abstraction—a "virtualization"— of an actual physical computer system. FIGS. 1-9 illustrate aspects of various virtualization system embodiments in which the virtualization system may delegate to a memory management unit or other facility of underlying hardware tracking of memory accesses that target memory locations that themselves encode guest page tables maintained by a guest computation executing on a virtual machine. In some embodiments (including embodiments described with reference to FIGS. 7, 8 and 9), particular hardware facilities are contemplated. In describing embodiments of the present invention, certain aspects of more complete virtualization system implementations have been abstracted. To facilitate an understanding of the broad applicability of embodiments of the present invention, a few examples of specific virtualization system designs and variations thereon are described.

In general, in most virtualization system designs, some interface is provided between guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Also, as some virtualization functionality has already been implemented in some hardware architectures, and other virtualization functionality may be implemented in hardware in the future, a term such as virtualization logic may be interpreted more broadly to encompass virtualization solutions that comprise any combination of hardware and/or software. Unless otherwise indicated, embodiments of the present invention may be used (and/or implemented) in (or in conjunction with) virtualized computer systems having any type or configuration of virtualization logic.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1, 3 and 5), in some virtualization system implementations, these "components" are at least partially implemented as constructs or emulations exported to a VM by the VMM. One advantage of such an arrangement is that the VMM may be set up to export "generic" devices, which facilitate VM migration and hardware platform-independence. In general, such functionality may be said to exist in the VM or the VMM.

Figure 10:
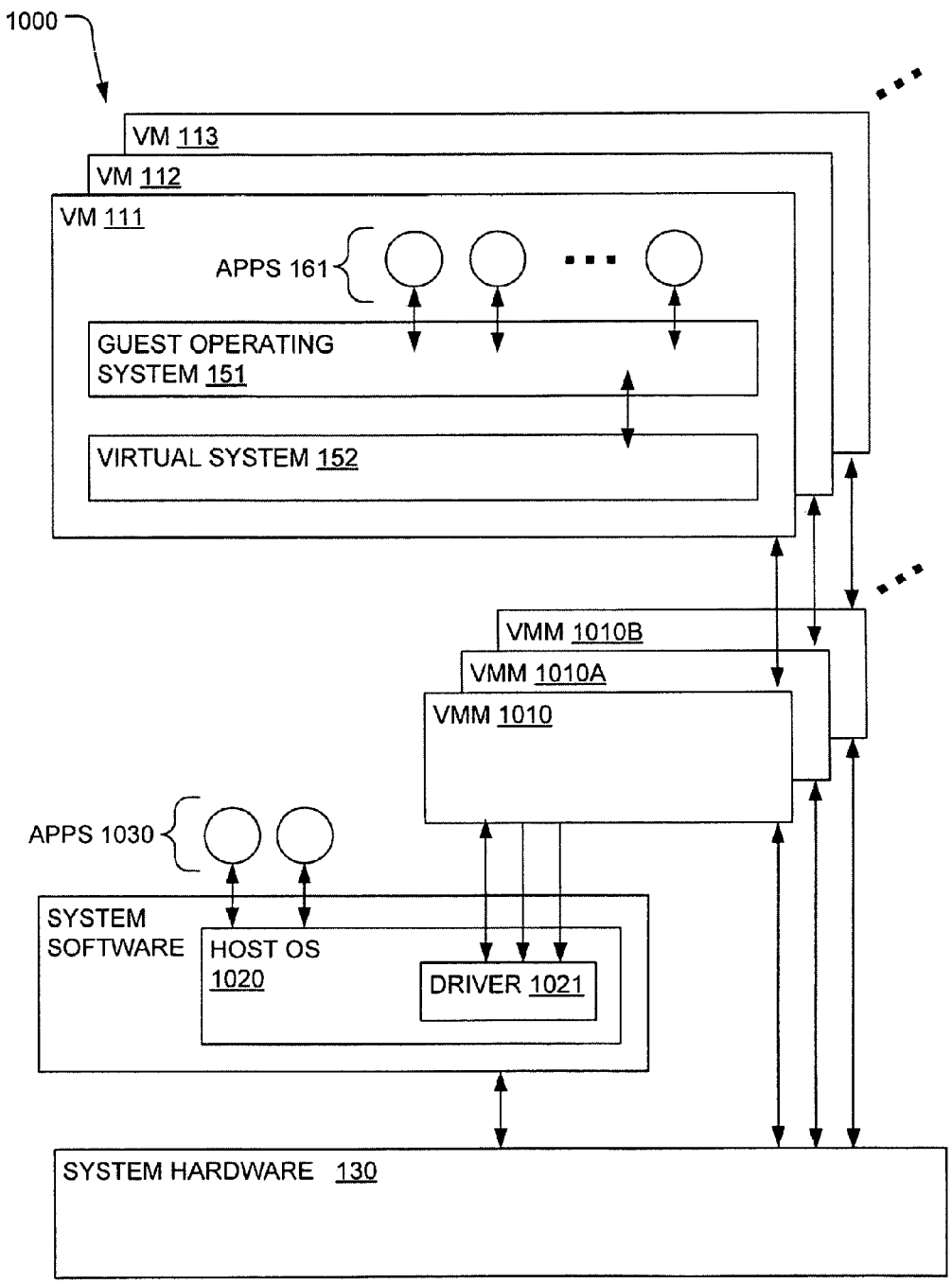
FIGS. 10 and 11 depict functional block diagrams of virtualization system configurations in accordance with respective embodiments of the present invention.
Figure 11:
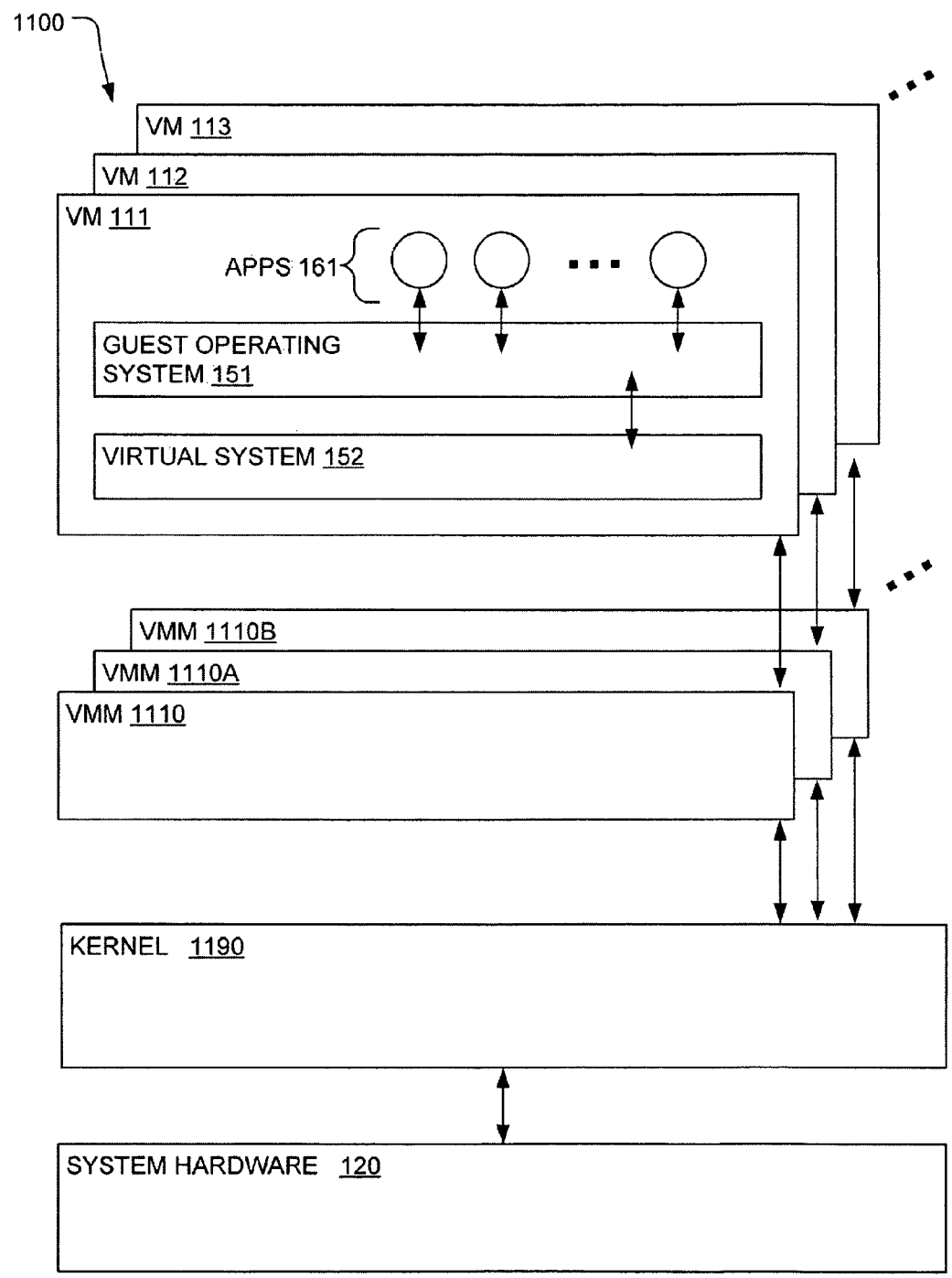

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 10 and 11. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Embodiments of the present invention in which the virtualization system delegates to hardware recordation of relevant information for certain write accesses and defers processing of such information until a later time at which the virtualization may (or must) re-establish coherence may build on systems of either configuration. Accordingly, in view of the variations, two exemplary virtualization system configurations are summarized and, based on the preceding description, persons of ordinary skill in the art will appreciate suitable hosted and non-hosted embodiments of the present invention.

Hosted Virtual Computers

FIG. 10 illustrates a virtualization system configuration 1000 commonly referred to as a "hosted" virtualized computer system in which a virtual machine monitor (e.g., VMM 1010, VMM 1010A, VMM 1010B) is co-resident at system level with the host operating system 1020 such that both the VMMs and the host operating system can independently modify the state of the host processor. VMMs call into the host operating system via driver 1021 and a dedicated one of the user-level applications 1030 to have the host OS perform certain I/O operations on behalf of the VM. The virtual computer in this configuration is thus hosted in that it runs in coordination with an existing host operating system. Virtualization systems that include suitable facilities are available in the marketplace. For example, VMware® Server virtual infrastructure software available from VMware, Inc., Palo Alto, Calif. implements a hosted virtualization system configuration consistent with the illustration of FIG. 10. VMware® Workstation desktop virtualization software, also available from VMware, Inc. also implements a hosted virtualization system configuration consistent with the illustration of FIG. 10.

Non-Hosted Virtual Computers

FIG. 11 illustrates a virtualization system configuration commonly referred to as a "non-hosted" virtualized computer system in which a dedicated kernel 1190 takes the place of and performs the conventional functions of a host operating system. Virtual computers (e.g., VM/VMM pairs) run on the kernel. Compared with a hosted system, use of a kernel can offer improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. For example, VMware ESX™ and ESX Server virtual infrastructure software available from VMware, Inc., Palo Alto, Calif. implements a non-hosted virtualization system configuration consistent with the illustration of FIG. 11. ESX is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term which has yet to achieve a universally accepted definition is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization. Furthermore, embodiments of techniques described herein for interdicting system calls can also be applied to "hypercalls" between a guest and a VMM or hypervisor. In general, hypercall mechanisms are part of a well-defined interface for transitioning between the guest and the VMM/hypervisor, while system call mechanisms are part of a well-defined interface for transitioning between user-mode and kernel-mode. Accordingly, based on the description herein, persons of ordinary skill in the art will appreciate analogous, hypercall-targeted adaptations of the aforementioned techniques for interdicting system calls.

Other Embodiments

While the invention(s) is (are) described with reference to various implementations and embodiments, it will be understood that these embodiments are illustrative and that the scope of the invention(s) is not limited to them. In general, virtual machines may be implemented consistent with hardware systems now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system techniques for monitoring registered code may be incorporated in so-called "para-virtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while strategies for maintaining coherency have been described in detail herein, other techniques and strategies will also be appreciated by persons of ordinary skill in the art based on the description herein. Furthermore, while techniques and mechanisms have been described using particular network configurations, hardware architectures, memory organizations and particular operating system constructs (typically IA-32 based architectures/systems and Windows or Linux-based operating systems) as a descriptive framework, persons of ordinary skill in the art will recognize that it is straightforward to modify such implementations for use in systems that support other processor instruction set architectures, other network or memory configurations and/or other operating system constructs. Furthermore, although certain embodiments of the present invention are illustrated herein in a descriptive context that includes software distributed conventionally (and often in multiple separately packaged components) as operating system and/or application software that are together executable as a guest computation, other guest software models are also possible. For example, guest software instances may be implemented as "so-called" virtual appliances in the form of pre-built, pre-configured, ready-to-run applications typically packaged with an operating system inside a virtual machine as a self-contained, self-consistent, software solution.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a virtualization system, the method comprising:

supplying underlying hardware with indications of those locations in physical memory for which the virtualization system is to receive buffered write information, the indicated locations corresponding to those that encode page mapping information of a guest operating system executing in a virtual machine of the virtualization system; and asynchronous with write-type accesses performed for the guest operating system which target the indicated locations, but responsive to a coherency-inducing operation of the guest operating system, updating a virtualization system page table based on the buffered write information, the virtualization system page table mapping addresses to machine addresses in physical memory.

2. The method of claim 1, further comprising:
maintaining the virtualization system page table in memory accessible to a memory management unit of the underlying hardware, the virtualization system page table including at least some entries that map addresses to physical pages that themselves encode guest page table information, wherein the indicated locations are coded using page attributes of the corresponding virtualization system page table entries.

3. The method of claim 1, further comprising:
responsive to the coherency-inducing operation, retrieving from a buffer maintained in storage of the underlying hardware, information sufficient to allow the virtualization system to update the virtualization system page table in correspondence with write-type accesses to those pages in the physical memory which encode guest page table information.

4. The method of claim 3, further comprising:
responsive to a buffer-full indication, performing the retrieving of sufficient information and, based thereon, updating the virtualization system page table.

5. The method of claim 3,
wherein the sufficient information includes an identification of guest page table entries affected by write-type memory accesses.

6. The method of claim 3,
wherein the sufficient information includes an encoding of the content of the updates.

7. The method of claim 3,
wherein, for at least some write-type memory accesses that target a guest page table entry, the sufficient information includes an encoding of guest page mapping state both before and after the write-type memory accesses.

8. The method of claim 3,
wherein at least some entries of the buffer collapse information corresponding to plural write-type memory accesses that target a particular guest page table entry.

9. The method of claim 1, wherein the coherency-inducing operation includes one or more of:
a flush of a virtual translation lookaside buffer (vTLB); and
an invalidation of a particular entry of the vTLB.

10. A computer program product embodied in one or more non-transitory computer readable storage media and including program code executable on a physical computer having one or more physical processors, the program code implementing a method of operating a virtualization system, the method comprising:

supplying underlying hardware with indications of those locations in physical memory for which the virtualization system is to receive buffered write information, the indicated locations corresponding to those that encode page mapping information of a guest operating system executing in a virtual machine of the virtualization system; and asynchronous with write-type accesses performed for the guest operating system which target the indicated locations, but responsive to a coherency-inducing operation of the guest operating system, updating a virtualization system page table based on the buffered write information, the virtualization system page table mapping addresses to machine addresses in physical memory.

11. The computer program product of claim 10, further comprising:
maintaining the virtualization system page table in memory accessible to a memory management unit of the underlying hardware, the virtualization system page table including at least some entries that map addresses to physical pages that themselves encode guest page table information, wherein the indicated locations are coded using page attributes of the corresponding virtualization system page table entries.

12. The computer program product of claim 10, further comprising:
responsive to the coherency-inducing operation, retrieving from a buffer maintained in storage of the underlying hardware, information sufficient to allow the virtualization system to update the virtualization system page table in correspondence with write-type accesses to those pages in the physical memory which encode guest page table information.

13. The computer program product of claim 12, further comprising:
responsive to a buffer-full indication, performing the retrieving of sufficient information and, based thereon, updating the virtualization system page table.

14. The computer program product of claim 12,
wherein the sufficient information includes an identification of guest page table entries affected by write-type memory accesses.

15. The computer program product of claim 12,
wherein the sufficient information includes an encoding of the content of the updates.

16. The computer program product of claim 12,
wherein, for at least some write-type memory accesses that target a guest page table entry, the sufficient information includes an encoding of guest page mapping state both before and after the write-type memory accesses.

17. The computer program product of claim 12,
wherein at least some entries of the buffer collapse information corresponding to plural write-type memory accesses that target a particular guest page table entry.

18. The computer program product of claim 10, wherein the coherency-inducing operation includes one or more of:
a flush of a virtual translation lookaside buffer (vTLB); and
an invalidation of a particular entry of the vTLB.

* * * * *